United States Patent
Gahleitner et al.

(10) Patent No.: US 11,578,198 B2
(45) Date of Patent: Feb. 14, 2023

(54) POLYPROPYLENE COMPOSITION WITH LOW SHRINKAGE AT WIDE APPLICATION TEMPERATURE RANGE

(71) Applicant: BOREALIS AG, Vienna (AT)

(72) Inventors: Markus Gahleitner, Krems (AT); Klaus Bernreitner, Linz (AT); Jingbo Wang, Engerwitzdorf (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/637,402

(22) PCT Filed: Aug. 24, 2018

(86) PCT No.: PCT/EP2018/072846
§ 371 (c)(1),
(2) Date: Feb. 7, 2020

(87) PCT Pub. No.: WO2019/042875
PCT Pub. Date: Mar. 7, 2019

(65) Prior Publication Data
US 2020/0165425 A1    May 28, 2020

(30) Foreign Application Priority Data

Aug. 28, 2017  (EP) .................................... 17188122

(51) Int. Cl.
| | | |
|---|---|---|
| C08L 23/12 | (2006.01) | |
| C08L 23/16 | (2006.01) | |
| C08F 210/06 | (2006.01) | |
| C08F 2/00 | (2006.01) | |
| C08F 210/02 | (2006.01) | |
| C08F 4/6592 | (2006.01) | |

(52) U.S. Cl.
CPC ............. *C08L 23/12* (2013.01); *C08F 2/001* (2013.01); *C08F 4/65927* (2013.01); *C08F 210/02* (2013.01); *C08F 210/06* (2013.01); *C08F 2500/17* (2013.01); *C08F 2500/33* (2021.01); *C08F 2500/34* (2021.01); *C08F 2500/37* (2021.01); *C08L 2201/00* (2013.01); *C08L 2205/025* (2013.01); *C08L 2207/02* (2013.01); *C08L 2314/06* (2013.01)

(58) Field of Classification Search
None
See application file for complete search history.

(56) References Cited

U.S. PATENT DOCUMENTS

| | | |
|---|---|---|
| 2013/0197153 A1 | 8/2013 | Kheirandish et al. |
| 2016/0176997 A1* | 6/2016 | Resconi ............... C08F 210/16 526/65 |
| 2020/0165425 A1 | 5/2020 | Gahleitner et al. |

FOREIGN PATENT DOCUMENTS

| | | |
|---|---|---|
| CN | 106795346 A | 5/2017 |
| EP | 0316187 B1 | 2/1994 |
| EP | 0887379 A | 12/1998 |
| EP | 2426171 A1 | 3/2012 |
| EP | 2891667 A1 | 7/2015 |
| EP | 3450472 A1 | 3/2019 |
| RU | 2446181 C1 | 3/2012 |
| WO | 92/12182 A1 | 7/1992 |
| WO | 94/14856 A1 | 7/1994 |
| WO | 95/12622 A1 | 5/1995 |
| WO | 99/24479 A1 | 5/1999 |
| WO | 93/051934 A2 | 6/2003 |
| WO | 2006/069733 A1 | 7/2006 |
| WO | 2006/097497 A1 | 9/2006 |
| WO | 2010/052260 A1 | 5/2010 |
| WO | 2010/052263 A1 | 5/2010 |
| WO | 2010/052264 A1 | 5/2010 |
| WO | 2013/007650 A1 | 1/2013 |
| WO | 2013/150057 A1 | 10/2013 |
| WO | 2013150057 A1 | 10/2013 |
| WO | 2016/066453 A2 | 5/2016 |
| WO | WO2017129721 * | 8/2017 |
| WO | 2019042875 A1 | 3/2019 |

OTHER PUBLICATIONS

Busico, et al., "Microstructure of polypropylene", Prog. Polym. Sci. 26 (2001) pp. 443-533.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, pp. 1128-1134.
Busico, et al., "Full Assignment of the 13C NMR Spectra of Regioregular Polypropylenes: Methyl and Methylene Region", Macromolecules 1997, 30, 6251-6263.
H. N. Cheng, "l3C NMR Analysis of Ethylene-Propylene Rubbers", Macromolecules 1984, 17, 1950-1955.
James C. Randall, "A Review of High Resolution Liquid 13Carbon Nuclear Magnetic Resonance Characterizations of Ethylene-Based Polymers", C29 201, 1989.
Resconi et al., "Selectivity in Propene Polymerization with Metallocene Catalysts", Chem. Rev. 2000, 100, pp. 1253-1345.
Wang et al., "Structural Analysis of Ethylene/Propylene Copolymers Synthesized with a Constrained Geometry Catalyst", Macromolecules 2000, 33, pp. 1157-1162.

(Continued)

*Primary Examiner* — David J Buttner
(74) *Attorney, Agent, or Firm* — Tarolli, Sundheim, Covell & Tummino LLP

(57) ABSTRACT

The present application relates to a polypropylene composition having a melt flow rate MFR.2 (230° C.) measured according to ISO 1133 in the range of 5 to 50 g/10 min, to a composition comprising the polypropylene composition and one or more additive(s) in an amount of up to 4 wt.-%, based on the total weight of the composition, to a process for the preparation of the polypropylene composition and an article comprising the polypropylene composition as well as the use of the polypropylene composition for decreasing the brittle-to-ductile transition temperature.

13 Claims, 2 Drawing Sheets

(56) References Cited

OTHER PUBLICATIONS

Zhou et al., "A new decoupling method for accurate quantification of polyethylene copolymer composition and triad sequence distribution with 13C NMR", Journal of Magnetic Resonance 187 (2007) pp. 225-233.
Monrabal, et al., "Soluble Fraction Analysis in Polypropylene: Characterization of the whole polymer, amorphous and a Quality Control Laboratory", 2014, pp. 18-23.
Grein, et al., "Impact Modified Isotatic Polypropylene with Controlled Rubber Intrinsic Viscosities: Some New Aspects About Morphology and Fracture", Journal of Applied Polymer Science, vol. 87, 1702-1712 (2003).
Singh, et al., "Triad sequence determination of ethylene-propylene copolymers—application of quantitative 13C NMR", Polymer Testing 28 (2009) 475-479.
Kakugo, et al., "13C NMR Determination of Monomer Sequence Distribution in Ethylene-Propylene Copolymers Prepared with o-TiC13-Al(C2H5)hCl", Macromolecules 1982, 15, 1150-1152.
Russian Search Report for Application No. 2020107677/04(012322) dated Jul. 13, 2020.
Canadian Office Action for Application No. 3,070,053 dated Jul. 29, 2020.
Russian Office Action for Application No. 2020107677/04(012322) dated Jul. 14, 2020.

\* cited by examiner

POLYPROPYLENE COMPOSITION WITH LOW SHRINKAGE AT WIDE APPLICATION TEMPERATURE RANGE

The present application relates to a polypropylene composition having a melt flow rate MFR$_2$ (230° C.) measured according to ISO 1133 in the range of 5 to 50 g/10 min, to a composition comprising the polypropylene composition and one or more additive(s) in an amount of up to 4 wt.-%, based on the total weight of the composition, to a process for the preparation of the polypropylene composition and an article comprising the polypropylene composition as well as the use of the polypropylene composition for decreasing the brittle-to-ductile transition temperature.

Polypropylenes are used in many applications and are for instance the material of choice in the field of automotive applications because they can be tailored to specific purposes needed. In automotive applications, it is specifically desired to provide low shrinkage in processing combined with a wide application temperature range. Conventional heterophasic polypropylene polymers are based on a matrix phase and an elastomer phase and are typically produced with heterogeneous Ziegler Natta catalysis. These polymers, however, suffer from a number of design problems. First of all, increasing the elastomer content (i.e. the EPR phase), the presence of which is required in a certain concentration to thereby improve impact strength will necessarily reduce the stiffness or tensile modulus of the polymer and thus also the heat resistance of the material. Furthermore, the $C_3/C_2$-ratio in the disperse elastomer phase defines both the glass transition point Tg of the elastomer (EPR) phase and the compatibility with the matrix component, the latter co-defining the particle size. In addition thereto, a certain molecular weight limit (frequently expressed as intrinsic viscosity (IV(EPR))) has to be overcome for the elastomer phase to effectively increase the impact strength, whilst too high molecular weight will both reduce the overall flowability of the composition and again increase the particle size. Finally, low shrinkage is required in a lot of applications. This parameter is strongly influences by the elastomer composition and molecular weight ratio between the elastomer phase and matrix phase. In general, low molecular weight with high propylene ($C_3$) content (and hence low ethylene ($C_2$) content) in the elastomer phase is preferred. However, this creates a dilemma between the impact strength and shrinkage as it is very difficult to reduce the shrinkage without sacrificing the impact strength.

As a result, polypropylene compositions providing a good balance between shrinkage and mechanical properties, such as expressed by the brittle-to-ductile transition temperature, are still desired.

The finding of the present invention is that a polypropylene composition having a good balance between shrinkage and mechanical properties, such as expressed by the brittle-to-ductile transition temperature, can be obtained with a specific polypropylene composition having a $C_3$ rich crystalline fraction which has been produced in the presence of a single-site catalyst.

Therefore the present invention is directed to a polypropylene composition having a melt flow rate MFR$_2$ (230° C.) measured according to ISO 1133 in the range of 5 to 50 g/10 min, the polypropylene composition comprising
(a) 55 to 75 wt.-%, based on the total weight of the polypropylene composition, of a crystalline fraction (CF) as determined in the CRYSTEX QC method, the crystalline fraction (CF) having
    i) a melting temperature ($T_m$) measured by differential scanning calorimetry (DSC) between 147° C. and 162° C., and
    ii) an ethylene content of 1.0 wt.-%, based on the total weight of the crystalline fraction (CF); and
(b) 25 to 45 wt.-%, based on the total weight of the polypropylene composition, of a soluble fraction (SF) as determined in the CRYSTEX QC method, the soluble fraction (SF) having
    i) an intrinsic viscosity (IV) in the range of 1.0 to 2.0 dl/g, and
    ii) an ethylene content in the range of 18 to 40 wt.-%, based on the total weight of the soluble fraction (SF),
wherein said polypropylene composition has a ratio of intrinsic viscosity of the soluble fraction (IV(SF)) to intrinsic viscosity of the crystalline fraction (IV(CF)) [(IV(SF))/(IV(CF))] in the range from 0.7 to <1.2.

According to one embodiment of the present invention, the polypropylene composition comprises a polypropylene homopolymer matrix (M) and an ethylene-propylene copolymer (EPC) dispersed in the polypropylene homopolymer matrix (M).

According to another embodiment of the present invention, the polypropylene composition comprises 60 to 72 wt.-%, based on the total weight of the polypropylene composition, of the crystalline fraction (CF), and 28 to 40 wt.-%, based on the total weight of the polypropylene composition, of the soluble fraction (SF).

According to yet another embodiment of the present invention, the polypropylene composition has i) an ethylene content in the range of 4.0 to 15.0 wt.-%, based on the total weight of the polypropylene composition, and/or ii) a melt flow rate MFR$_2$ (230° C.) measured according to ISO 1133 in the range of 8 to 40 g/10 min, preferably in the range of 8 to 30 g/10 min.

According to one embodiment of the present invention, the polypropylene composition has i) a melting temperature ($T_m$) measured by differential scanning calorimetry (DSC) between 147° C. and 162° C., and/or ii) a crystallization temperature (Tc) measured by differential scanning calorimetry (DSC) between 105° C. and 135° C.

According to another embodiment of the present invention, the ratio of intrinsic viscosity of the soluble fraction (IV(SF)) to intrinsic viscosity of the crystalline fraction (IV(CF)) [(IV(SF))/(IV(CF))] is in the range from 0.8 to 1.1.

According to yet another embodiment of the present invention, the polypropylene composition is polymerized in the presence of a single-site catalyst.

According to yet another embodiment of the present invention, the polypropylene composition has been produced in a multi-stage process.

According to one embodiment of the present invention, the crystalline fraction (CF) has i) a melting temperature ($T_m$) measured by differential scanning calorimetry (DSC) between 148° C. and 156° C., and/or ii) an ethylene content in the range from 0.1 to 0.8 wt.-%, based on the total weight of the crystalline fraction, and/or iii) an intrinsic viscosity (IV) in the range of 0.9 to 2.2 dl/g, and/or iv) an isotacticity determined as pentad regularity from 13C-NMR spectroscopy of at least 98%, and/or v) a content of <2,1> erythro regiodefects as determined from 13C-NMR spectroscopy of equal or less than 0.2 mol.-%.

According to another embodiment of the present invention, the soluble fraction (SF) has i) an intrinsic viscosity (IV) in the range of 1.1 to 1.9 dl/g, and/or ii) an ethylene content in the range of 18 to 30 wt.-%, based on the total weight of the soluble fraction (SF).

According to yet another embodiment of the present invention, the relative content of isolated to block ethylene sequences (I(E)) i) of the polypropylene composition is at most 30%, and/or ii) of the xylene cold soluble fraction (XCS) is at least 30%, wherein the I(E) content is defined by equation (I)

$$I(E) = \frac{fPEP}{(fEEE + fEEP + fPEP)} \times 100 \quad (I)$$

wherein I(E) is the relative content of isolated to block ethylene sequences [in %]; fPEP is the mol fraction of propylene/ethylene/propylene sequences (PEP) in the sample; fEEP is the mol fraction of ethylene/ethylene/propylene sequences (EEP) and of propylene/ethylene/ethylene sequences (PEE) in the sample; fEEE is the mol fraction of ethylene/ethylene/ethylene sequences (EEE) in the sample wherein all sequence concentrations being based on a statistical triad analysis of $^{13}$C-NMR data.

According to a further aspect, the present invention refers to a process for the preparation of a polypropylene composition as defined herein, wherein a polypropylene homopolymer matrix (M) is prepared in a first stage and an ethylene-propylene copolymer (EPC) is prepared in a second stage in the presence of the polypropylene homopolymer matrix (M).

According to another aspect, the present invention refers to a composition comprising the polypropylene composition as defined herein and one or more additive(s) in an amount of up to 4 wt.-%, based on the total weight of the composition.

According to a still further aspect, the present invention refers to an article comprising the polypropylene composition as defined herein or the composition comprising the polypropylene composition.

According to an even further aspect, the present invention refers to the use of the polypropylene composition as defined herein for decreasing the brittle-to-ductile transition temperature, wherein the brittle-to-ductile transition temperature is derived from the Charpy instrumented impact strength at an impact velocity of 1.5 m/s as a function of temperature and represents the temperature at the inflexion point of the obtained curve. It is preferred that the brittle-to-ductile transition temperature (BDTT) as measured in an instrumented Charpy notched impact strength test in line with ISO 179 1eA is in the range from −10 to +5° C.

In the following, the invention is defined in more detail.
The Polypropylene Composition The polypropylene composition according to this invention is a heterophasic ethylene/propylene copolymer. By heterophasic is meant that the polymer contains both a crystalline fraction and a soluble fraction. It must be made using a single site catalyst material, e.g. one as herein defined.

The polypropylene composition as a whole has a melt flow rate $MFR_2$ (230° C.) measured according to ISO 1133 in the range of 5 to 50 g/10 min. It is preferred that the polypropylene composition has a melt flow rate $MFR_2$ (230° C.) measured according to ISO 1133 in the range of 8 to 40 g/10 min, preferably in the range of 8 to 30 g/10 min.

In one embodiment, the polypropylene composition has an ethylene content in the range of 4.0 to 15.0 wt.-%, based on the total weight of the polypropylene composition. Preferably, the polypropylene composition has an ethylene content in the range of 5.0 to 14.0 wt.-% and most preferably in the range of 6.0 to 13.0 wt.-%, based on the total weight of the polypropylene composition.

Thus, it is appreciated that the polypropylene composition preferably has
i) a melt flow rate $MFR_2$ (230° C.) measured according to ISO 1133 in the range of 5 to 50 g/10 min, more preferably in the range of 8 to 40 g/10 min, and most preferably in the range of 8 to 30 g/10 min, and
ii) an ethylene content in the range of 4.0 to 15.0 wt.-%, preferably in the range of 5.0 to 14.0 wt.-%, and most preferably in the range of 6.0 to 13.0 wt.-%, based on the total weight of the polypropylene composition.

Additionally or alternatively, the polypropylene composition has a melting temperature ($T_m$) measured by differential scanning calorimetry (DSC) according to ISO 11357 between 147° C. and 162° C., preferably between 148 and 158° C.

It is appreciated that the polypropylene composition may also have a crystallization temperature ($T_c$) measured by differential scanning calorimetry (DSC) between 105° C. and 135° C., preferably between 108 and 128° C.

Thus, it is preferred that the polypropylene composition has
i) a melting temperature ($T_m$) measured by differential scanning calorimetry (DSC) between 147° C. and 162° C., preferably between 148 and 158° C., and/or
ii) a crystallization temperature (To) measured by differential scanning calorimetry (DSC) between 105° C. and 135° C., preferably between 108 and 128° C.

For example, the polypropylene composition has
i) a melting temperature ($T_m$) measured by differential scanning calorimetry (DSC) between 147° C. and 162° C., preferably between 148 and 158° C., or
ii) a crystallization temperature ($T_c$) measured by differential scanning calorimetry (DSC) between 105° C. and 135° C., preferably between 108 and 128° C.

Alternatively, the polypropylene composition has
i) a melting temperature ($T_m$) measured by differential scanning calorimetry (DSC) between 147° C. and 162° C., preferably between 148 and 158° C., and
ii) a crystallization temperature (To) measured by differential scanning calorimetry (DSC) between 105° C. and 135° C., preferably between 108 and 128° C.

Furthermore the inventive polypropylene composition preferably has at least a first glass transition temperature $T_g(1)$ and a second glass transition temperature $T_g(2)$, wherein said first glass transition temperature $T_g(1)$ is above the second glass transition temperature $T_g(2)$. The glass transition temperatures $T_g(1)$ and $T_g(2)$ are determined by dynamic mechanical thermal analysis (DMTA) according to ISO 6721-7.

Accordingly, the polypropylene composition has a first glass transition temperature $T_g(1)$ in the range from +10 to −10° C., preferably from +5 to −5° C. and a second glass transition temperature $T_g(2)$ in the range from −30 to −50° C., more preferably from −32 to −48° C.

The polypropylene composition has a multiphase structure, which can be identified by the presence of at least two distinct glass transition temperatures. The higher first glass transition temperature ($T_g(1)$) represents the crystalline fraction (CF), i.e. the crystalline polypropylene homopolymer, whereas the lower second glass transition temperature ($T_g(2)$) reflects the soluble fraction (SF) of the polypropylene composition.

It is required that the polypropylene composition comprises from 55 to 75 wt.-%, based on the total weight of the polypropylene composition, of a crystalline fraction (CF)

and from 25 to 45 wt.-%, based on the total weight of the polypropylene composition, of a soluble fraction (SF) as determined in the CRYSTEX QC method.

It is appreciated that the sum of the percentage amounts of the crystalline fraction (CF) and the soluble fraction (SF) is 100 wt.-%, based on the total weight of the polypropylene composition.

In one embodiment, the polypropylene composition comprises 60 to 72 wt.-%, based on the total weight of the polypropylene composition, of the crystalline fraction (CF), and 28 to 40 wt.-%, based on the total weight of the polypropylene composition, of the soluble fraction (SF) as determined in the CRYSTEX QC method. Most preferably, the polypropylene composition comprises 61 to 69 wt.-%, based on the total weight of the polypropylene composition, of the crystalline fraction (CF), and 31 to 39 wt.-%, based on the total weight of the polypropylene composition, of the soluble fraction (SF) as determined in the CRYSTEX QC method.

As already mentioned above, the polypropylene composition of the present invention is a heterophasic ethylene/propylene copolymer which are generally well known in the art. Such heterophasic ethylene/propylene copolymers comprise a matrix (M) being either a propylene homopolymer or a random propylene copolymer in which an ethylene-propylene copolymer (EPC), i.e. elastomeric copolymer, is dispersed. Thus the polypropylene matrix contains (finely) dispersed inclusions being not part of the matrix and said inclusions contain the elastomer. The term inclusion indicates that the matrix and the inclusion form different phases within the heterophasic ethylene/propylene copolymer, said inclusions are for instance visible by high resolution microscopy, like electron microscopy or scanning force microscopy or atomic force microscopy, or by dynamic mechanical thermal analysis (DMTA).

It is thus appreciated that the polypropylene composition of the present invention preferably comprises a polypropylene homopolymer matrix (M) and an ethylene-propylene copolymer (EPC) dispersed in the polypropylene homopolymer matrix (M).

It is one requirement of the present invention that the intrinsic viscosity (IV) of the soluble fraction (IV(SF)) and the intrinsic viscosity of the crystalline fraction (IV(CF)) are in a well-defined range in order to obtain a good balance between shrinkage and mechanical properties, such as expressed by the brittle-to-ductile transition temperature. In particular, it has been found that the polypropylene composition must have a ratio of intrinsic viscosity of the soluble fraction (IV(SF)) to intrinsic viscosity of the crystalline fraction (IV(CF)) [(IV(SF))/(IV(CF))] in the range from 0.7 to <1.2. Preferably, the ratio of intrinsic viscosity of the soluble fraction (IV(SF)) to intrinsic viscosity of the crystalline fraction (IV(CF)) [(IV(SF))/(IV(CF))] is in the range from 0.8 to 1.1. It is appreciated that advantageous results are obtained if the intrinsic viscosity of the soluble fraction (IV(SF)) and the intrinsic viscosity of the crystalline fraction (IV(CF)) are about the same, i.e. differ by not more than 0.3 dl/g, preferably by not more than 0.2 dl/g and most preferably by not more than 0.1 dl/g.

The polypropylene composition preferably has a xylene cold soluble (XCS) fraction measured according to ISO 16152 (25° C.) of 25.0 to 45.0 wt.-%. The xylene cold soluble portion of the polypropylene composition as a whole is preferably in the range of 28.0 to 40.0 wt.-%, even more preferably in the range of 31.0 to 39.0 wt.-%.

It is appreciated that the polypropylene composition has a specific relative content of isolated to blocky ethylene sequences (I(E)).

The I(E) content is defined by equation (I)

$$I(E) = \frac{fPEP}{(fEEE + fEEP + fPEP)} \times 100 \qquad (I)$$

wherein

I(E) is the relative content of isolated to blocky ethylene sequences [in %];

fPEP is the mol fraction of propylene/ethylene/propylene sequences (PEP) in the sample;

fEEP is the mol fraction of ethylene/ethylene/propylene sequences (EEP) and of propylene/ethylene/ethylene sequences (PEE) in the sample;

fEEE is the mol fraction of ethylene/ethylene/ethylene sequences (EEE) in the sample wherein all sequence concentrations being based on a statistical triad analysis of $^{13}$C-NMR data.

The I(E) content of the polypropylene composition, which can also be called normalized PEP value (nPEP), is preferably at most 30%, more preferably in the range from 15 to 30% and most preferably in the range from 18 to 27%.

The polypropylene composition of the present invention has a low shrinkage in the longitudinal (in flow) and/or transverse (across flow) direction. Preferably, the shrinkage in the longitudinal (in-flow) direction is less than 1.25%, more preferably less than 1.10%, even more preferably less than 0.95%.

Additionally or alternatively, the shrinkage in the transverse (across flow) direction is less than 1.30%, more preferably less than 1.20%, even more preferably less than 1.10%.

Thus, the polypropylene composition has a shrinkage
i) in the longitudinal (in-flow) direction of less than 1.25%, more preferably less than 1.10%, even more preferably less than 0.95%, and
ii) in the transverse (across flow) direction of less than 1.30%, more preferably less than 1.20%, even more preferably less than 1.10%.

The flexural modulus of the polypropylene composition of the invention measured according to ISO 178 is preferably at least 500 MPa, such as at least 550 MPa. More preferably, the flexural modulus of the polypropylene composition measured according to ISO 178 is in the range from 500 to 1100 MPa, preferably from 550 to 1000 MPa, and most preferably from 600 to 950 MPa.

The polypropylene composition of the invention has an excellent brittle to ductile transition temperature (BDTT) at a temperature of +25° C. or less, such as +10° C. or less, more preferably +5° C. or less, determined from Charpy instrumented impact strength according to ISO 179-2:2000. A reasonable lower limit for the BDTT is −10° C. In one embodiment, the brittle-to-ductile transition temperature (BDTT) as measured in an instrumented Charpy notched impact strength test in line with ISO 179 1eA is in the range from −10 to +5° C.

All parameters described in the present application can be determined by the methods as described in the example section below.

Crystalline Fraction (CF)

It is appreciated that the polypropylene composition comprises a crystalline fraction (CF).

The crystalline fraction (CF) is preferably made up of a propylene homopolymer or propylene ethylene copolymer. The ethylene content in this component is low. In particular, it is required that the ethylene content is of ≤1 wt.-%, based on the total weight of the crystalline fraction (CF). Even more preferably there is ≤0.8 wt.-% ethylene in the crystalline fraction (CF), such as ≤0.5 wt.-% or less. For example, the crystalline fraction (CF) has an ethylene content in the range from 0.1 to 1.0 wt.-%, such as from 0.1 to 0.8 wt.-% or from 0.1 to 0.5 wt.-%, based on the total weight of the crystalline fraction. In one embodiment, the crystalline fraction (CF) contains propylene units only.

The polypropylene composition comprises the crystalline fraction (CF) as determined in the CRYSTEX QC method in an amount ranging from 55 to 75 wt.-%, based on the total weight of the polypropylene composition. Preferably, the polypropylene composition comprises the crystalline fraction (CF) as determined in the CRYSTEX QC method in an amount ranging from 60 to 72 wt.-%, and most preferably from 61 to 69 wt.-%, based on the total weight of the polypropylene composition.

The crystalline fraction (CF) has a melting temperature Tm determined by DSC analysis according to ISO 11357 in the range of 147° C. to 162° C., more preferably in the range of 148° C. to 158° C. and most preferably in the range of 148° C. to 156° C.

The glass transition temperature of the crystalline fraction (CF) is preferably in the range of +10 to −10° C., e.g. +5 to −5° C.

The crystalline fraction (CF) is ideally an isotactic propylene matrix component. The crystalline fraction (CF) may consist of a single propylene homopolymer but may also comprise a mixture of different propylene homopolymers.

In one embodiment, the crystalline fraction (CF) has an intrinsic viscosity of 0.9 to 2.2 dl/g, preferably 1.0 to 2.0 dl/g, more preferably 1.1 to 1.9 dl/g. The intrinsic viscosity is measured according to DIN ISO 1628/1, October 1999 (in Decalin at 135° C.).

Preferably, the crystalline fraction (CF) is isotactic. Accordingly, it is appreciated that the crystalline fraction (CF) has a rather high pentad concentration, i.e. higher than 98%, more preferably higher than 98.5%, and preferably higher than 99%.

Preferably, the crystalline fraction (CF) has low amount of regio defects. Accordingly it is preferred that the crystalline fraction (CF) has 2,1 erythro regio-defects of below 0.2%, preferably below 0.15%, more preferably below 0.1% determined by $^{13}$C-NMR spectroscopy. In one specific embodiments no 2,1-erythro regio-defects are detectable.

Wherever in the instant invention the amount of defects, i.e. 2,1 erythro regio-defects and stereo-defects (mmmm pentad), are indicated by "%" the average percentage of propylene units in the polymer chain is meant.

Soluble Fraction (SF)

It is appreciated that the polypropylene composition further comprises a soluble fraction (SF).

The ethylene content in the soluble fraction (SF) is moderately high. In particular, it is required that the ethylene content is from 18 to 40 wt.-%, based on the total weight of the soluble fraction (SF). Even more preferably there is 18 to 30 wt.-% ethylene in the soluble fraction (SF). For example, the soluble fraction (SF) has an ethylene content in the range from 18 to 28 wt.-%, such as from 19 to 25 wt.-%, based on the total weight of the soluble fraction (SF).

The soluble fraction (SF) preferably consists of a propylene-ethylene copolymer.

The polypropylene composition comprises the soluble fraction (SF) as determined in the CRYSTEX QC method in an amount ranging from 25 to 45 wt.-%, based on the total weight of the polypropylene composition. Preferably, the polypropylene composition comprises the soluble fraction (SF) as determined in the CRYSTEX QC method in an amount ranging from 28 to 40 wt.-%, and most preferably from 31 to 39 wt.-%, based on the total weight of the polypropylene composition.

It is one requirement of the present invention that the soluble fraction (SF) has an intrinsic viscosity of 1.0 to 2.0 dl/g, preferably 1.1 to 1.9 dl/g, more preferably 1.2 to 1.8 dl/g. The intrinsic viscosity is measured according to DIN ISO 1628/1, October 1999 (in Decalin at 135° C.).

It is appreciated that the xylene cold soluble fraction (XCS) of the polypropylene composition has a specific content of isolated to blocky ethylene sequences (I(E)).

The I(E) content is defined by equation (I)

$$I(E) = \frac{fPEP}{(fEEE + fEEP + fPEP)} \times 100 \quad (I)$$

wherein

I(E) is the relative content of isolated to block ethylene sequences [in %];

fPEP is the mol fraction of propylene/ethylene/propylene sequences (PEP) in the sample;

fEEP is the mol fraction of ethylene/ethylene/propylene sequences (EEP) and of propylene/ethylene/ethylene sequences (PEE) in the sample;

fEEE is the mol fraction of ethylene/ethylene/ethylene sequences (EEE) in the sample wherein all sequence concentrations being based on a statistical triad analysis of $^{13}$C-NMR data.

The I(E) content of the XCS, which can also be called normalized PEP value (nPEP), is preferably at least 30%, more preferably in the range from 30 to 60% and most preferably in the range from 35 to 50%.

It is furthermore preferred that the xylene cold soluble fraction (XCS) of the polypropylene composition has a specific content of blocky to isolated ethylene sequences (B(E)).

The B(E) content is defined by equation (Ia)

$$B(E) = \frac{fEEE}{(fEEE + fEEP + fPEP)} \times 100 \quad (Ia)$$

wherein

B(E) is the relative content of blocky to isolated ethylene sequences [in %];

fPEP is the mol fraction of propylene/ethylene/propylene sequences (PEP) in the sample;

fEEP is the mol fraction of ethylene/ethylene/propylene sequences (EEP) and of propylene/ethylene/ethylene sequences (PEE) in the sample;

fEEE is the mol fraction of ethylene/ethylene/ethylene sequences (EEE) in the sample wherein all sequence concentrations being based on a statistical triad analysis of $^{13}$C-NMR data.

The B(E) content of the XCS, which can also be called normalized EEE value (nEEE), is preferably at most 25%, more preferably in the range from 10 to 25% and most preferably in the range from 12 to 23%.

Additionally it is preferred that the ethylene content of the xylene cold soluble (XCS) fraction as determined in $^{13}$C-NMR spectroscopy is in the range from 18 to 40 wt.-%, more preferably from 18 to 30 wt.-%, even more preferably from 18 to 28 wt.-%, based on the total weight of the xylene cold soluble (XCS) fraction.

In one preferred embodiment, the comonomer in the xylene cold soluble (XCS) fraction is ethylene only.

Catalyst

The polypropylene composition of the present invention is polymerized in the presence of a single-site catalyst.

The catalyst used in the invention can be used in non-supported form or in solid form. The catalyst of the invention should however be used as a heterogeneous (solid) catalyst.

Generally the quantity of catalyst will depend upon the nature of the catalyst, the reactor types and conditions and the properties desired for the polypropylene composition.

The catalyst of the invention in solid form, preferably in solid particulate form, can be either supported on an external carrier material, like silica or alumina, or, in a particularly preferred embodiment, is free from an external carrier, however still being in solid form. For example, the solid catalyst is obtainable by a process in which
(a) a liquid/liquid emulsion system is formed, said liquid/liquid emulsion system comprising a solution of the catalyst components (i) a complex and (ii) a cocatalyst; dispersed in a solvent so as to form dispersed droplets; and
(b) solid particles are formed by solidifying said dispersed droplets.

The catalyst is ideally manufactured by obtaining (i) a complex e.g. of formula (I) and (ii) a cocatalyst; forming a liquid/liquid emulsion system, which comprises a solution of catalyst components (i) and (ii) dispersed in a solvent, and solidifying said dispersed droplets to form solid particles.

By free from an external carrier is meant that the catalyst does not contain an external support, such as an inorganic support, for example, silica or alumina, or an organic polymeric support material.

In the definitions which follow, the term $C_{1-20}$hydrocarbyl group therefore includes $C_{1-20}$alkyl, $C_{2-20}$alkenyl, $C_{2-20}$alkynyl, $C_{3-20}$cycloalkyl, $C_{3-20}$cycloalkenyl, $C_{6-20}$aryl groups, $C_{7-20}$alkylaryl groups or $C_{7-20}$arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred $C_{1-20}$hydrocarbyl groups are $C_{1-20}$alkyl, $C_{4-20}$cycloalkyl, $C_{5-20}$cycloalkyl-alkyl groups, $C_{7-20}$alkylaryl groups, $C_{7-20}$arylalkyl groups or $C_{6-20}$aryl groups, especially $C_{1-10}$alkyl groups, $C_{6-10}$aryl groups, or $C_{7-12}$arylalkyl groups, e.g. $C_{1-8}$alkyl groups. Most especially preferred hydrocarbyl groups are methyl, ethyl, propyl, isopropyl, tertbutyl, isobutyl, $C_{5-6}$cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It is appreciated that in the complexes, the metal ion M is coordinated by ligands X so as to satisfy the valency of the metal ion and to fill its available coordination sites. The nature of these σ-ligands can vary greatly.

Catalyst activity is defined in this application to be the amount of polymer produced/g catalyst/h. The term productivity is also sometimes used to indicate the catalyst activity although herein it designates the amount of polymer produced per unit weight of catalyst.

The single site catalyst is preferably a metallocene. The preparation of the metallocene catalyst can be carried out according to or analogously to the methods known from the literature and is within the skills of an art skilled person. Said metallocenes typically bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula I:

$$(Cp)_m TMA_q \qquad (I)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

T is a bridge of 1-3 atoms, e.g. a bridge of 1-2 C-atoms or 1-2 heteroatoms, wherein the heteroatom(s) can be e.g. Si, Ge and/or O atom(s), whereby each of the bridge atoms may bear independently substituents, such as $C_1$-$C_{20}$-alkyl, tri($C_1$-$C_{20}$-alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —SiR$^1$$_2$, wherein each R$^1$ is independently $C_1$-$C_{20}$-alkyl, $C_6$-$C_{20}$-aryl or tri($C_1$-$C_{20}$-alkyl)silyl-residue, such as a trimethylsilyl-residue.

M is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_2$-aryl, $C_6$-$C_{20}$-aryloxy, $C_7$-$C_{20}$-arylalkyl, $C_7$-$C_{20}$-arylalkenyl, —CH$_2$—Y, wherein Y is $C_{6-20}$-aryl, $C_{6-20}$-heteroaryl, $C_{1-20}$-alkoxy, $C_{6-20}$-aryloxy, —NR"$_2$, —SiR"$_3$ or OSiR"$_3$, —SR", —PR"$_3$, —SiR"$_3$, —OSiR"$_3$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Each of the above mentioned ring moieties alone or as a part of a moiety as the substituent for Cp, A, R" or R<1> can further be substituted e.g. with $C_1$-$C_{20}$-alkyl which may contain Si and/or O atoms;

n is 1 or 2, e.g. 1,
m is 1, 2 or 3, e.g. 1 or 2,
q is 1, 2 or 3, e.g. 2 or 3, wherein m+q is equal to the valency of M.

Whilst therefore the invention is generally applicable to a stereospecific single site catalyst, the polyproyplene composition is preferably prepared in the presence of a metallocene of formula (II). It is understood that the complex used in the invention consists of its racemic mixture.

Metallocenes of formula (II) therefore include:

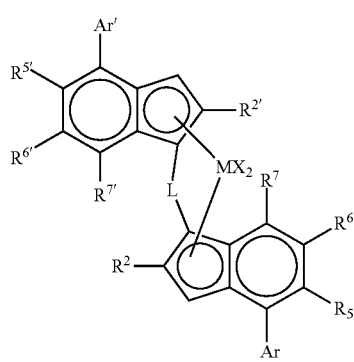

(II)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$hydrocarbyl radical optionally containing one or more heteroatoms from groups 14-16;
$R^5$ and $R^{5'}$ are each independently hydrogen, $C_{1-20}$hydrocarbyl group optionally containing one or more heteroatoms from groups 14-16 and optionally substituted by one or more halo atoms;
$R^6$ and $R^{6'}$ are each independently hydrogen or a $C_{1-20}$hydrocarbyl group optionally containing one or more heteroatoms from groups 14-16; or
$R^5$ and $R^6$ taken together can form a 5 or 6 membered saturated or unsaturated carbon ring fused to the 6-membered ring of the indenyl group; or
$R^{5'}$ and $R^{6'}$ taken together can form a 5 or 6 membered saturated or unsaturated carbon ring fused to the 6-membered ring of the indenyl group;
$R^7$ and $R^{7'}$ are each independently hydrogen or $C_{1-20}$hydrocarbyl group optionally containing one or more heteroatoms from groups 14-16;
Ar is independently an aryl or heteroaryl group having up to 20 carbon atoms optionally substituted by one or more groups R';
Ar' is independently an aryl or heteroaryl group having up to 20 carbon atoms optionally substituted by one or more groups R';
each R' is a $C_{1-20}$hydrocarbyl group or two R<1> groups on adjacent carbon atoms taken together can form a fused 5 or 6 membered non aromatic ring with the Ar group, said ring being itself optionally substituted with one or more groups $R^4$; and
each $R^4$ is a $C_{1-20}$hydrocarbyl group.

More preferably, the complex is of formula (III)

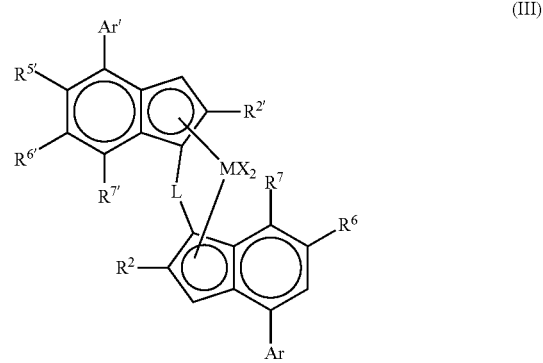

(III)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$hydrocarbyl radical optionally containing one or more heteroatoms from groups 14-16;
$R^{5'}$ is a $C_{1-20}$hydrocarbyl group optionally containing one or more heteroatoms from groups 14-16 and optionally substituted by one or more halo atoms;
$R^6$ and $R^{6'}$ are each independently hydrogen or a $C_1$-$C_{20}$hydrocarbyl group optionally containing one or more heteroatoms from groups 14-16;
$R^7$ and $R^{7'}$ are each independently hydrogen or $C_1$-$C_{20}$hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups R';
each $R^1$ is a $C_1$-$C_{20}$hydrocarbyl group or two $R^1$ groups on adjacent carbon atoms taken together can form a fused 5 or 6 membered non aromatic ring with the Ar group, said ring being itself optionally substituted with one or more groups $R^4$; and
each R' is a $C_1$-$C_{20}$hydrocarbyl group.

The complexes are symmetrical or asymmetrical, preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

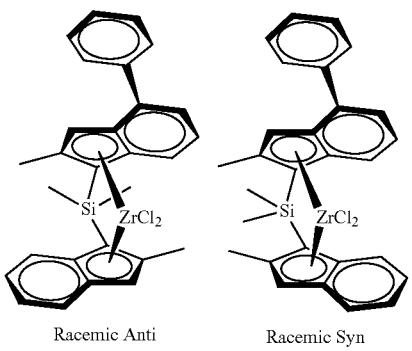

Racemic Anti    Racemic Syn

Formula (III) is intended to cover both syn and anti configurations, preferably anti. It is required in addition in compounds of formula (III), that the group $R^{5'}$ is not hydrogen where the 5-position in the other ligand carries a hydrogen.

In fact, the metallocenes of the invention are ideally $C_1$-symmetric but they maintain a pseudo-$C_2$-symmetry since they maintain $C_2$-symmetry in close proximity of the metal center, although not at the ligand periphery. As will be seen, the use of two different indenyl ligands as described in this invention allows for a much finer structural variation, hence a more precise tuning of the catalyst performance, compared to the typical $C_2$-symmetric catalysts. By nature of their chemistry, both anti and syn enantiomer pairs are formed during the synthesis of the complexes. However, by using the ligands of this invention, separation of the preferred anti isomers from the syn isomers is straightforward.

It is preferred if the metallocenes are employed as the rac anti isomer. Ideally therefore at least 95% mol, such as at least 98% mol, especially at least 99% mol of the metallocene is in the racemic anti isomeric form.

In the catalysts of the invention: M is preferably Zr.

Each X, which may be the same or different, is preferably a hydrogen atom, a halogen atom, a R, OR, $OSO_2CF_3$, OCOR, SR, $NR_2$ or $PR_2$ group wherein R is a linear or branched, cyclic or acyclic, $C_{1-20}$alkyl, $C_{2-20}$alkenyl, $C_{2-20}$alkynyl, $C_{6-20}$aryl, $C_{7-20}$alkylaryl or $C_{7-20}$arylalkyl radical; optionally containing heteroatoms belonging to groups 14-16. R is preferably a $C_{1-6}$alkyl, phenyl or benzyl group.

Most preferably each X is independently a hydrogen atom, a halogen atom, $C_{1-6}$alkoxy group or an R group, e.g. preferably a $C_{1-6}$alkyl, phenyl or benzyl group. Most preferably, X is chlorine or a methyl radical. Preferably, both X groups are the same.

L is preferably an alkylene linker or a bridge comprising a heteroatom, such as silicon or germanium, e.g. —$SiR^8_2$—, wherein each $R^8$ is independently $C_{1-20}$alkyl, $C_{3-10}$cycloalkyl, $C_{6-20}$aryl or tri($C_{1-20}$alkyl)silyl, such as trimethylsilyl. More preferably $R^8$ is $C_{1-6}$alkyl, especially methyl or $C_{3-7}$cycloalkyl, such as cyclohexyl. Most preferably, L is a dimethylsilyl or a methylcyclohexylsilyl bridge (i.e. Me-Si-cyclohexyl). It may also be an ethylene bridge.

$R^2$ and $R^{2'}$ can be different but they are preferably the same. $R^2$ and $R^{2'}$ are preferably a $C_{1-10}$hydrocarbyl group such as $C_{1-6}$hydrocarbyl group. More preferably, it is a linear or branched $C_{1-10}$alkyl group. More preferably, it is a linear or branched $C_{1-6}$alkyl group, especially linear $C_{1-6}$alkyl group such as methyl or ethyl.

The $R^2$ and $R^{2'}$ groups can be interrupted by one or more heteroatoms, such as 1 or 2 heteroatoms, e.g. one heteroatom, selected from groups 14 to 16 of the periodic table. Such a heteroatom is preferably O, N or S, especially O. More preferably however the $R^2$ and $R^{2'}$ groups are free from heteroatoms. Most especially $R^2$ and $R^{2'}$ methyl, especially both methyl.

The two Ar groups Ar and Ar' can be the same or different. It is preferred however if the Ar groups are different. The Ar' group may be unsubstituted. The Ar' is preferably a phenyl based group optionally substituted by groups $R^1$, especially an unsubstituted phenyl group.

The Ar group is preferably a $C_{6-20}$aryl group such as a phenyl group or naphthyl group. Whilst the Ar group can be a heteroaryl group, such as carbazolyl, it is preferable that Ar is not a heteroaryl group. The Ar group can be unsubstituted or substituted by one or more groups $R^1$, more preferably by one or two $R^1$ groups, especially in position 4 of the aryl ring bound to the indenyl ligand or in the 3,5-positions.

In one embodiment both Ar and Ar' are unsubstituted. In another embodiment Ar' is unsubstituted and Ar is substituted by one or two groups $R^1$.

$R^1$ is preferably a $C_{1-20}$hydrocarbyl group, such as a $C_{1-20}$alkyl group. $R^1$ groups can be the same or different, preferably the same. More preferably, $R^1$ is a $C_{2-10}$alkyl group such as $C_{3-8}$alkyl group. Highly preferred groups are tert butyl or isopropyl groups. It is preferred if the group $R^1$ is bulky, i.e. is branched. Branching might be alpha or beta to the ring. Branched $C_{3-8}$alkyl groups are also favoured therefore.

In a further embodiment, two $R^1$ groups on adjacent carbon atoms taken together can form a fused 5 or 6 membered non aromatic ring with the Ar group, said ring being itself optionally substituted with one or more groups $R^4$. Such a ring might form a tetrahydroindenyl group with the Ar ring or a tetrahydronaphthyl group.

If an $R^4$ group is present, there is preferably only 1 such group. It is preferably a $C_{1-10}$alkyl group.

It is preferred if there is one or two $R^1$ groups present on the Ar group. Where there is one $R^1$ group present, the group is preferably para to the indenyl ring (4-position). Where two $R^1$ groups are present these are preferably at the 3 and 5 positions.

$R^5$ is preferably H.

$R^{5'}$ is preferably a $C_{1-20}$hydrocarbyl group containing one or more heteroatoms from groups 14-16 and optionally substituted by one or more halo atoms or $R^{5'}$ is a $C_{1-10}$alkyl group, such as methyl but most preferably it is a group $Z'R^{3'}$.

$R^6$ and $R^{6'}$ may be the same or different. In one preferred embodiment one of $R^6$ and $R^{6'}$ is hydrogen, especially $R^6$. It is preferred if $R^6$ and $R^{6'}$ are not both hydrogen. If not hydrogen, it is preferred if each $R^6$ and $R^{6'}$ is preferably a $C_{1-20}$hydrocarbyl group, such as a $C_{1-20}$alkyl group or $C_{6-10}$aryl group. More preferably, $R^6$ and $R^{6'}$ are a $C_{2-10}$alkyl group such as $C_{3-8}$alkyl group. Highly preferred groups are tert-butyl groups. It is preferred if $R^6$ and $R^{6'}$ are bulky, i.e. are branched. Branching might be alpha or beta to the ring. Branched $C_{3-8}$alkyl groups are also favoured therefore.

In a further embodiment, $R^5$ and $R^6$ taken together form a 5 membered carbon ring with the atoms to which they are attached.

In a further embodiment, $R^5$ and $R^{6'}$ taken together form a 5 membered carbon ring with the atoms to which they are attached.

The $R^7$ and $R^{7'}$ groups can be the same or different. Each $R^7$ and $R^{7'}$ group is preferably hydrogen, a $C_{1-6}$alkyl group or is a group $ZR^3$. It is preferred if $R^{7'}$ is hydrogen. It is preferred if $R^7$ is hydrogen, $C_{1-6}$alkyl or $ZR^3$. The combination of both $R^7$ and $R^{7'}$ being hydrogen is most preferred.

It is also preferred if $ZR^3$ represents $OC_{1-6}$alkyl, such as methoxy. It is also preferred is $R^7$ represents $C_{1-6}$alkyl such as methyl.

Z and Z' are O or S, preferably O.

$R^3$ is preferably a $C_{1-10}$hydrocarbyl group, especially a $C_{1-10}$alkyl group, or aryl group optionally substituted by one or more halo groups. Most especially $R^3$ is a $C_{1-6}$alkyl group, such as a linear $C_{1-6}$alkyl group, e.g. methyl or ethyl $R^{3'}$ is preferably a $C_{1-10}$hydrocarbyl group, especially a $C_{1-10}$alkyl group, or aryl group optionally substituted by one or more halo groups. Most especially $R^{3'}$ is a $C_{1-6}$alkyl group, such as a linear $C_{1-6}$alkyl group, e.g. methyl or ethyl or it is a phenyl based radical optionally substituted with one or more halo groups such as Ph or $C_6F_5$.

Thus, preferred complexes of the invention are of formula (IV') or (IV)

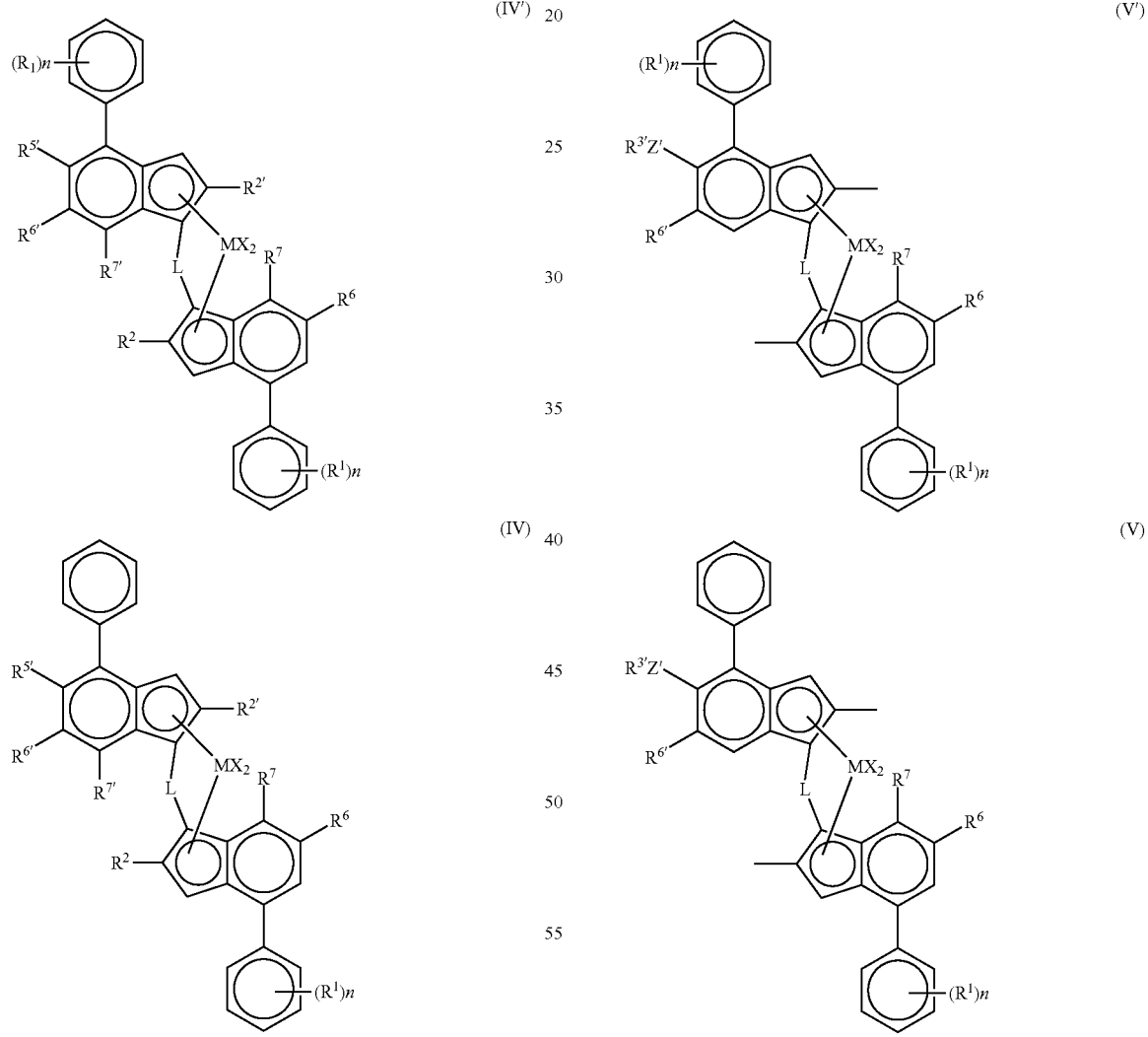

(IV')

(IV)

wherein
M is zirconium or hafnium;
each X is a sigma ligand, preferably each X is independently a hydrogen atom, a halogen atom, $C_{1-6}$alkoxy group, $C_{1-6}$alkyl, phenyl or benzyl group; L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$alkyl, $C_{3-10}$cycloalkyl, tri($C_{1-20}$-alkyl)silyl, $C_{6-20}$aryl, $C_{7-20}$arylalkyl or $C_{7-20}$alkylaryl;
each $R^2$ or $R^{2'}$ is a $C_{1-10}$alkyl group;
$R^{5'}$ is a $C_{1-10}$alkyl group or $Z'R^{3'}$ group;
$R^6$ is hydrogen or a $C_{1-10}$alkyl group;
$R^{6'}$ is a $C_{1-10}$alkyl group or $C_{6-10}$aryl group;
$R^7$ is hydrogen, a $C_{1-6}$alkyl group or $ZR^3$ group;
$R^{7'}$ is hydrogen or a $C_{1-10}$alkyl group;
Z and Z' are independently O or S;
$R^{3'}$ is a $C_{1-10}$alkyl group, or a $C_{6-10}$aryl group optionally substituted by one or more halo groups;
$R^3$ is a $C_{1-10}$alkyl group;
each n is independently 0 to 4, e.g. 0, 1 or 2;
and each $R^1$ is independently a $C_{1-20}$hydrocarbyl group, e.g. $C_{1-10}$alkyl group.

In one embodiment, the metallocene is a complex of formula (V') or (V):

(V')

(V)

wherein M is zirconium or hafnium;
each X is a sigma ligand, preferably each X is independently a hydrogen atom, a halogen atom, $C_{1-6}$alkoxy group, $C_{1-6}$alkyl, phenyl or benzyl group;
L is a divalent bridge selected from —R'$_2$C— or —R'$_2$Si— wherein each R' is independently a hydrogen atom, $C_{1-20}$alkyl or $C_{3-10}$cycloalkyl;

$R^6$ is hydrogen or a $C_{1-10}$alkyl group;
$R^{6'}$ is a $C_{1-10}$alkyl group or $C_{6-10}$aryl group;
$R^7$ is hydrogen, $C_{1-6}$alkyl or $OC_{1-6}$alkyl;
$Z'$ is O or S;
$R^{3'}$ is a $C_{1-10}$alkyl group, or $C_{6-10}$aryl group optionally substituted by one or more halo groups;
n is independently 0 to 4, e.g. 0, 1 or 2; and
each $R^1$ is independently a $C_{1-10}$alkyl group.

In one embodiment, the metallocene is a complex of formula (VI') or (VI):

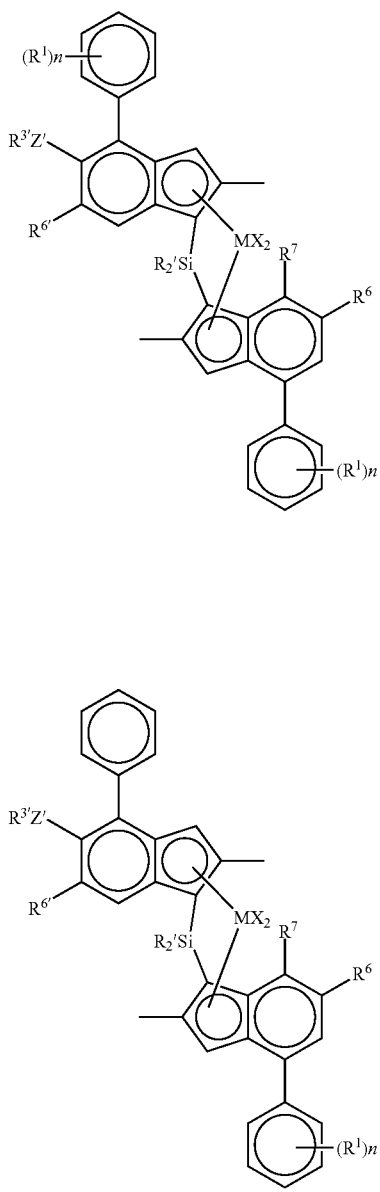

M is zirconium or hafnium;
each X is a sigma ligand, preferably each X is independently a hydrogen atom, a halogen atom, $C_{1-6}$alkoxy group, $C_{1-6}$alkyl, phenyl or benzyl group;
each R' is independently a hydrogen atom, $C_{1-20}$alkyl or $C_{3-7}$cycloalkyl;
$R^6$ is hydrogen or a $C_{1-10}$alkyl group;
$R^{6'}$ is a $C_{1-10}$alkyl group or $C_{6-10}$aryl group;
$R^7$ is hydrogen, $C_{1-6}$alkyl or $OC_{1-6}$alkyl;
$Z'$ is O or S;
$R^{3'}$ is a $C_{1-10}$alkyl group, or $C_{6-10}$aryl group optionally substituted by one or more halo groups;
n is independently 0, 1 to 2; and
each $R^1$ is independently a $C_{3-8}$alkyl group.

Most especially, the metallocene is of formula (VII') or (VII):

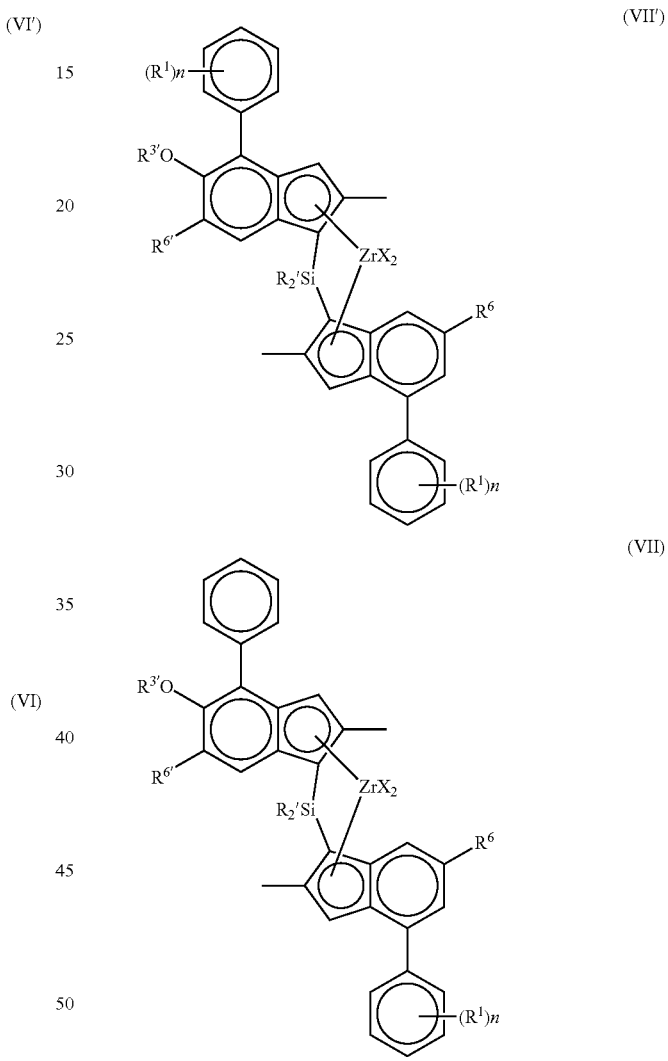

wherein each X is a sigma ligand, preferably each X is independently a hydrogen atom, a halogen atom, $C_{1-6}$alkoxy group, $C_{1-6}$alkyl, phenyl or benzyl group;
R' is independently a $C_{1-6}$alkyl or $C_{3-10}$cycloalkyl;
$R^1$ is independently $C_{3-8}$alkyl;
$R^6$ is hydrogen or a $C_{3-8}$alkyl group;
$R^{6'}$ is a $C_{3-8}$alkyl group or $C_{6-10}$aryl group;
$R^{3'}$ is a $C_{1-6}$alkyl group, or $C_{6-10}$aryl group optionally substituted by one or more halo groups; and
n is independently 0, 1 or 2.

Particular compounds of the invention include:

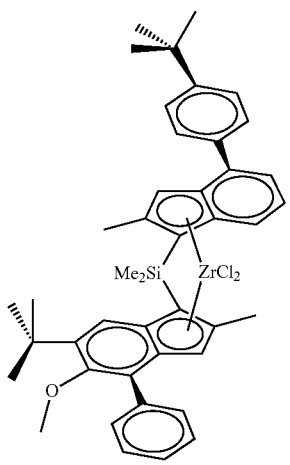

rac-anti-Me₂Si(2-Me-4-(p-tBuPh)-Ind)(2-Me-4-Ph-5-OMe-6-tBu-Ind)ZrCl₂

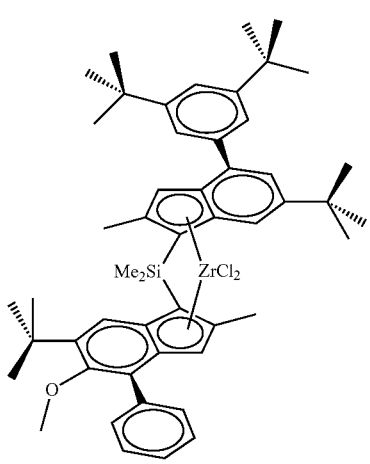

rac-anti-Me₂Si(2-Me-4-(3,5-di-tBuPh)-6-tBu-Ind)(2-Me-4-Ph-5-OMe-6-tBu-Ind)ZrCl₂

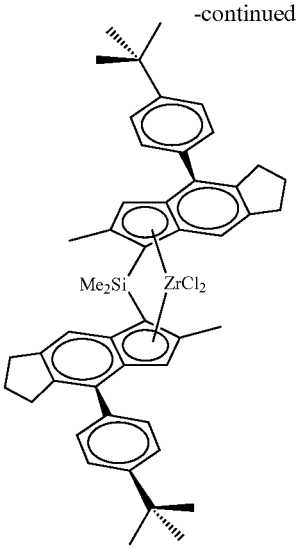

rac-dimethylsilanediylbis [2-methyl-4-(4-tert-butylphenyl)-1,5,6,7-tetrahydro-s-indacen-1-yl] zirconium dichloride

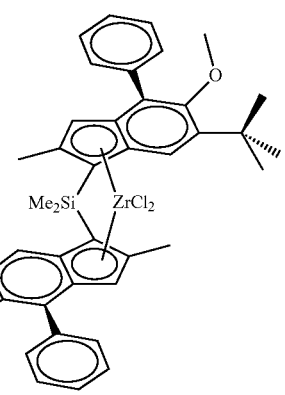

rac-dimethylsilanediylbis (2-methyl-4-phenyl-5-methoxy-6-tert-butyLinden-1-yl) zirconium dichloride

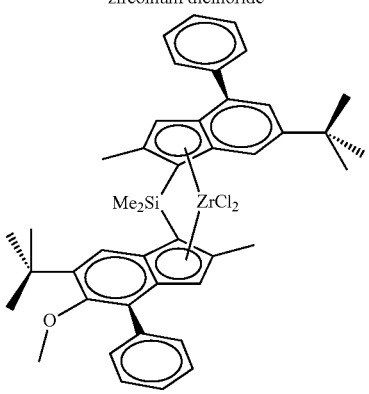

rac-anti-Me₂Si(2-Me-4-Ph-6-tBu-Ind)(2-Me-4-Ph-5-OMe-6-tBu-Ind)ZrCl₂

-continued

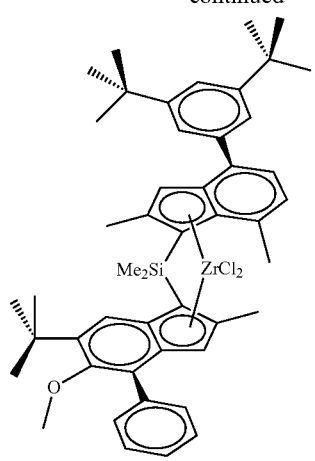

rac-anti-Me₂Si(2-Me-4-(3,5-di-tBuPh)-7-Me-Ind)(2-Me-4-Ph-5-OMe-6-tBu-Ind)ZrCl₂

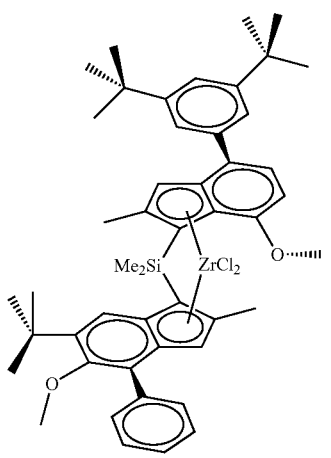

rac-anti-Me₂Si(2-Me-4-(3,5-di-tBuPh)-7-OMe-Ind)(2-Me-4-Ph-5-OMe-6-tBu-Ind)ZrCl₂

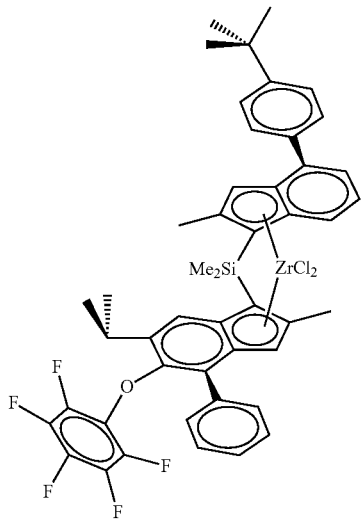

rac-anti-Me₂Si(2-Me-4-(p-tBuPh)-Ind)(2-Me-4Ph-5-OC₆F₅)-6-iPr-Ind)ZrCl₂

-continued

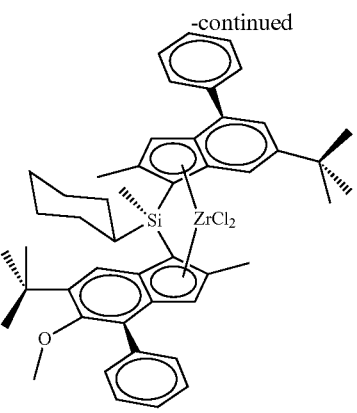

rac-anti-Me(CyHex)Si(2-Me-4-Ph-6-tBu-Ind)(2-Me-4-Ph-5-OMe-6-tBu-Ind)ZrCl₂

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

These catalysts can be made following the principles in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts such as $B(C_6F_5)_3$, $C_6H_5N(CH_3)_2H:B(C_6F)_4$, $(C_6H_5)_3C:B(C_6F_5)_4$ or $Ni(CN)_4$ $[B(C_6F_5)_3]_4{}^{2-}$ are also known. Suitable cocatalysts are described in WO2013/007650 which is herewith incorporated by reference.

Suitable amounts of cocatalyst will be well known to the person skilled in the art.

Catalyst Manufacture

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO094/14856 (Mobil), WO95/12622 (Borealis) and WO02006/097497. The particle size is not critical but is preferably in the range 5 to 200 μm, more preferably 20 to 80 μm. The use of these supports is routine in the art.

In an alternative embodiment no external carrier is used but the catalyst is still presented in solid particulate form. Thus no external support material such as inert organic or inorganic carrier, such as for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e.g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation. Such a catalyst prepolmyerisation step is also denoted "off-line prepolymerisation step" or "off-line prepolymerisation".

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264 which are all herewith incorporated by reference in their entirety. Preferable embodiments of this aspect of the invention are described herein.

As monomers in the catalyst prepolymerisation step preferably alpha-olefins are used. Preferable $C_2$-$C_{10}$ alpha olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimizing leaching of catalyst components and thus local overheating.

After prepolymerisation, the catalyst can be isolated and stored.

Polymerisation

The present invention is furthermore directed to a process for the preparation of the polypropylene composition according to the present invention.

The polymers of the invention can be prepared by blending the necessary components that have been formed separately. However, the polymers are typically and preferably made in a multistep process well known in the art. A preferred multistage process is a "loop-gas phase"-process, such as developed by Borealis A/S, Denmark (known as BORSTAR® technology) described e.g. in patent literature, such as in EP-A-0887379 or in WO 92/12182.

The invention preferably relates to the copolymerisation of propylene and ethylene as defined above and below, in at least a two step process so as to form the polypropylene composition. Preferably, propylene and ethylene are the only monomers used.

Polymerization in the process of the invention may be effected in two or more, e.g. 2 or 3, polymerization reactors. The process may also involve a prepolymerisation reaction. This prepolymerisation step is a conventional step used routinely in polymer synthesis and is to be distinguished from the catalyst prepolymerisation step discussed above.

Ideally, the process of the invention employs three main reactors, a first reactor operating in bulk, a first gas phase reactor and a second gas phase reactor. As outlined above, the process may also utilize a prepolymerisation step. This prepolymerisation step may be effected in the first reactor or maybe effected in a prepolymerisation reactor which is not one of the afore-mentioned main reactors. In case of bench-scale polymerisation prepolymerisation is frequently effected in the first (bulk) reactor whereas in production at a larger scale the prepolymerisation is usually effected in a prepolymerisation reactor which is not one of the afore-mentioned main reactors.

The inventive process of the invention forms the polypropylene composition. In that polymer, it is preferred that the first component, the matrix component (M) is a propylene homopolymer or random copolymer, preferably propylene homopolymer, and is subsequently combined with a ethylene-propylene copolymer (EPC) to form the polypropylene composition of the invention. The EPC fraction is preferably formed after formation of the matrix component and is preferably formed in the gas phase.

Thus, it is appreciated that the propylene homopolymer or random copolymer, preferably propylene homopolymer, as matrix component (M) is prepared in a first stage and the ethylene-propylene copolymer (EPC) is prepared in a second stage in the presence of the matrix component (M).

Ideally therefore a propylene homopolymer or random copolymer, preferably propylene homopolymer, as matrix component (M) is formed in a bulk step and a first gas phase step, and the ethylene-propylene copolymer (EPC) is formed in the second gas phase step.

It is thus appreciated that the polypropylene composition is preferably produced in a multi-stage process.

For bulk and gas phase copolymerisation reactions, the reaction temperature used will generally be in the range 60 to 115° C. (e.g. 70 to 110° C.), the reactor pressure will generally be in the range 10 to 40 bar for gas phase reactions with bulk polymerisation operating at slightly higher pressures. The residence time will generally be 0.25 to 8 hours (e.g. 0.3 to 3 hours). The gas used will be the monomer optionally as mixture with a non-reactive gas such as nitrogen or propane. It is a particular feature of the invention that polymerisation takes place at temperatures of at least 60° C.

Generally, the quantity of catalyst used will depend upon the nature of the catalyst, the reactor types and conditions and the properties desired for the polymer product. As is well known in the art hydrogen can be used for controlling the molecular weight of the polypropylene composition.

Composition

The present invention is furthermore directed to a composition comprising the polypropylene composition, as defined herein, and one or more additive(s) in an amount of up to 4 wt.-%, based on the total weight of the composition.

In one embodiment, the composition comprises a nucleating agent (NA). Additionally or alternatively, the composition may further comprise an inorganic filler, which, however, is not preferred.

Usually the polypropylene composition makes up at least 96.0 wt. % of the composition, preferably at least 97.0 wt. % of the composition and most preferably at least 97.5 wt. % of the composition.

Generally, nucleating agents promote the formation of crystallization nuclei when a melt of polypropylene is solidified and are thus increasing the crystallization speed and temperature of nucleated polypropylene compared to non-nucleated polypropylene.

The nucleating agent is preferably an alpha-nucleating agent.

The composition usually contains up to 2 wt.-% of at least one alpha-nucleating agent. A lower limit of 0.001 wt.-% of alpha-nucleating agent is preferred. Preferably the polyolefin composition comprises 0.005 to 0.5 wt.-%, more preferably 0.01 to 0.3 wt.-%, most preferably 0.04 to 0.25 wt.-% of at least one alpha-nucleating agent. The weight percent in the afore paragraph refers to the total amount of alpha-nucleating agents present.

Preferred examples of the alpha nucleating agents include sodium-2,2'-methylene-bis(4,6-di-t-butyl-phenyl)phosphate, sodium-2,2'-ethylidene-bis(4,6-di-t-butylphenyl)-phos-phate, lithium-2,2'-methylene-bis(4,6-di-t-butylphenyl)phosphate, lithium-2,2'-ethylidene-bis(4,6-di-t-butylphenyl)phosphate, sodium-2,2'-ethyli-dene-bis(4-i-propyl-6-t-butylphenyl)phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butyl-phenyl)-phosphate], calcium-bis[2,2'-thiobis(4-ethyl-6-t-butylphenyl)-phosphate], calcium-bis[2,2'-thiobis(4,6-di-t-butylphenyl)phosphate], magnesium-bis[2,2'-thiobis(4,6-di-t-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-t-butyl-phenyl)-phosphate, sodium-2,2'-t-octylmethylene-bis(4,6-dimethyl-phenyl)-phosphate, sodium-2,2'-t-octylmethylene-bis(4,6-di-t-butylphenyl)-phosphate, calcium-bis[2,2'-methylene-bis(4,6-di-t-butylphenyl)-phosphate], magnesium-bis[2,2'-methylene-bis(4,6-di-t-butylphenyl)-phosphate], barium-bis[2,2'-methylene-bis(4,6-di-t-butylphenyl)-phosphate], sodium-2,2'-methylene-bis(4-methyl-6-t-butylphenyl)-phosphate, sodium-2,2'-methy-lene-bis(4-ethyl-6-t-butylphenyl)phosphate, sodium(4,4'-dimethyl-5,6'-di-t-butyl-2,2'-biphenyl) phosphate, calcium-bis-[(4,4'-dimethyl-6,6'-di-t-butyl-2,2'-biphenyl)phosphate], sodium-2,2'-ethyli-dene-bis(4-m-butyl-6-t-butyl-phenyl)phosphate, sodium-2,2'-methylene-bis-(4,6-di-methylphenyl)-phos-phate, sodium-2,2'-methylene-bis(4,6-di-t-ethyl-phenyl)phosphate, potassium-2,2'-ethylidene-bis(4,6-di-t-butylphenyl)-phosphate, calcium-bis[2,2'-ethylidene-bis(4,6-di-t-butylphenyl)-phosphate], magnesium-bis[2,2'-ethyli-dene-bis(4,6-di-t-butylphenyl)-phosphate], barium-bis[2,2'-ethylidene-bis-(4,6-di-t-butylphenyl)-phosphate], aluminium-hydroxy-bis[2,2'-methylene-bis(4,6-di-t-butyl-phenyl)phosphate], aluminium-tris[2,2'-ethylidene-bis(4,6-di-t-butylphenyl)-phosphate].

A second group of phosphorous based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato] and blends thereof with Li-myristate or Li-stearate.

Of the phosphorous based nucleating agents sodium-2,2'-methylene-bis(4,6-di-t-butylphenyl)phosphate or aluminium-hydroxy-bis[2,2'-methy-lene-bis(4,6-di-t-butylphenyl)-phosphate] or aluminium-hydroxy-bis-[2,4,8,10-tetrakis(1,1-dimethylethyl)-6-hydroxy-12H-dibenzo-[d,g]-dioxa-phoshocin-6-oxidato] or blends thereof with Li-myristate or Li-stearate are especially preferred.

Also sorbitol-based nucleating agents, i.e. di(alkylbenzylidene)sorbitols like 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol or pine rosin can be used as nucleating agents, as well as nonitol derivatives, like 1,2,3-trideoxy-4,6;5,7-bis-O-[(4-propylphenyl)methylene] nonitol, and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479, the disclosure of which is incorporated herein by reference.

Suitable alpha-nucleating agents for the polypropylene composition of the invention are in addition nucleating agents, as described for example in Macromolecules 2005, 38, 3688-3695, the disclosure of which is incorporated herein by reference.

Nucleating agents such as ADK NA-11 (Methylen-bis(4,6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are commercially available from Asahi Denka Kokai and are among those which are preferably added to the polyolefin composition of the invention. Millad 3988 1,3:2,4 Bis(3,4-dimethylbenzylidene) sorbitol, Millad 3905 and Millad 3940 available from Milliken & Company are other examples of nucleating agents that can be utilised in the invention.

Further commercial available alpha-nucleating agents, which can be used for the composition of the invention are, for example, Irgaclear XT 386 (N-[3,5-bis-(2,2-dimethylpropionylamino)-phenyl]-2,2-dimethylpropionamide) from Ciba Speciality Chemicals, Hyperform HPN-68L and Hyperform HPN-20E from Milliken & Company.

Among all alpha-nucleating agents mentioned above, aluminium hydroxy-bis[2,4,8,10-tetrakis(1,1-dimethylethyl)-6-hydroxy-12H-dibenzo-[d,g]-dioxa-phoshocin-6-oxidato] based nucleating agents like ADK NA-21, NA-21 E, NA-21 F, etc., sodium-2,2'-methylene-bis(4,6-di-t-butylphenyl)phosphate (ADK NA-11), aluminium-hydroxy-bis[2,2'-methylene-bis(4,6-di-t-butyl-phenyl)-phosphate], sorbitol-based nucleating agents, i.e. di(alkylbenzylidene) sorbitols like 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, like 1,2,3-trideoxy-4,6;5,7-bis-O-[(4-propylphenyl)methylene] nonitol, and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide and polymeric nucleating agents selected from the group consisting of vinylcycloalkane polymers and vinylalkane polymers are particularly preferred.

Especially preferred are soluble nucleating agents like Millad 3988 (1,3:2,4-di(4-ethylbenzylidene) sorbitol and 1,3:2,4-Bis(3,4-dimethylbenzylidene) sorbitol) and Millad NX8000 (1,2,3-trideoxy-4,6;5,7-bis-O-[(4-propylphenyl)methylene] nonitol).

The composition is preferably having a melting temperature $T_m$ of 148 to 162° C.

Article

The present invention is furthermore directed to an article comprising the polypropylene composition as defined herein or the composition comprising the polypropylene composition as defined herein.

According to one embodiment of the invention, the polypropylene composition as defined herein or the composition comprising the polypropylene composition as defined herein are used for the production of films, extruded, blow moulded or injection moulded articles, such as pouches and bags, pipes and fittings, transport packaging containers as well as components for car exteriors and interiors, like dashboards, door claddings, consoles, bumpers and trims.

The article is preferably produced by any common conversion process suitable for thermoplastic polymers like injection moulding, extrusion blow moulding, injection stretch blow moulding or cast film extrusion.

According to a further aspect, the present invention refers to the use of the polypropylene composition as defined herein for decreasing the brittle-to-ductile transition temperature, wherein the brittle-to-ductile transition temperature is derived from the Charpy instrumented impact strength at an impact velocity of 1.5 m/s as a function of temperature and represents the temperature at the inflexion point of the obtained curve. It is preferred that the brittle-to-ductile transition temperature as measured in an instrumented Charpy notched impact strength test in line with ISO 179 1eA is in the range from −10 to +5° C.

Figure 1A:
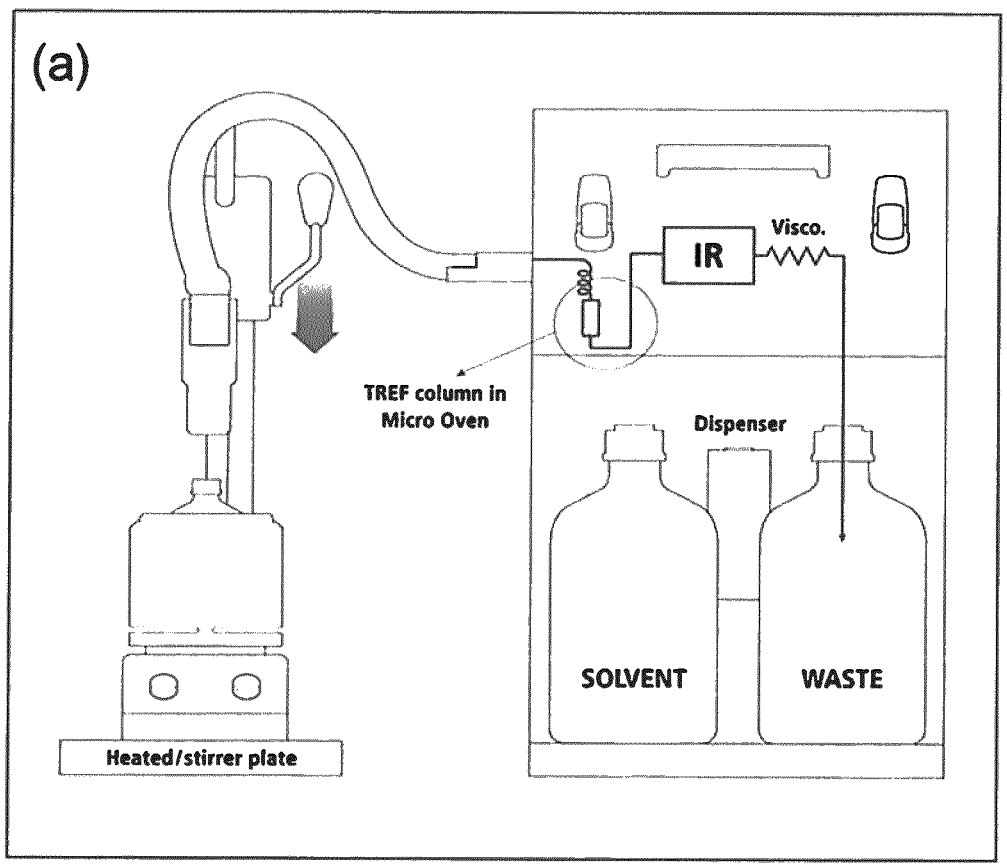
FIG. 1a relates to Schematic diagram of the CRYSTEX QC instrument.

The present invention will now be described in further detail by the examples provided below.

Examples

1. Definitions/Measuring Methods

The following definitions of terms and determination methods apply for the above general description of the invention as well as to the below examples unless otherwise defined. Melting temperature $T_m$, crystallization temperature $T_c$, is measured with Mettler TA820 differential scanning calorimetry (DSC) according to ISO 11357-1 on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and He) were measured by the DSC method according to ISO 11357-1.

$MFR_2$ (230° C.) was measured according to ISO 1133 (230° C., 2.16 kg load).

$MFR_2$ (190° C.) was measured according to ISO 1133 (190° C., 2.16 kg load).

The glass transition temperature Tg was determined by dynamic mechanical analysis according to ISO 6721-7. The measurements were done in torsion mode on compression moulded samples (40×10×1 mm$^3$) between −100° C. and +150° C. with a heating rate of 2° C./min and a frequency of 1 Hz.

The xylene cold solubles (XCS, wt.-%) were determined at 25° C. according to ISO 16152; first edition; 2005-07-01.

Intrinsic viscosity is measured according to DIN ISO 1628/1, October 1999 (in Decalin at 135° C.).

Quantification of Microstructure by NMR Spectroscopy

Quantitative nuclear-magnetic resonance (NMR) spectroscopy was used to quantify the stereo-regularity (tacticity), regio-regularity and comonomer content of the polymers. Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6k) transients were acquired per spectra.

Quantitative $^{13}C$ {$^1H$} NMR spectra were processed, integrated and relevant quantitative properties determined from the integrals using proprietary computer programs. For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[21e] \text{mol } \%=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E \text{ [mol \%]}=100*fE$$

The weight percent comonomer incorporation in the polymer was calculated from the mole fraction according to:

$$E \text{ [wt \%]}=100*(fE*28.05)/((fE*28.05)+((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX \text{ [mol \%]}=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E) \text{ [\%]}=100*(fPEP/fXEX)$$

Crystalline and Soluble Fractions and their Respective Properties

The crystalline (CF) and soluble fractions (SF) of the polypropylene compositions as well as the comonomer content and intrinsic viscosities of the respective fractions were analyzed by the CRYSTEX QC, Polymer Char (Valencia, Spain).

Figure 1B:
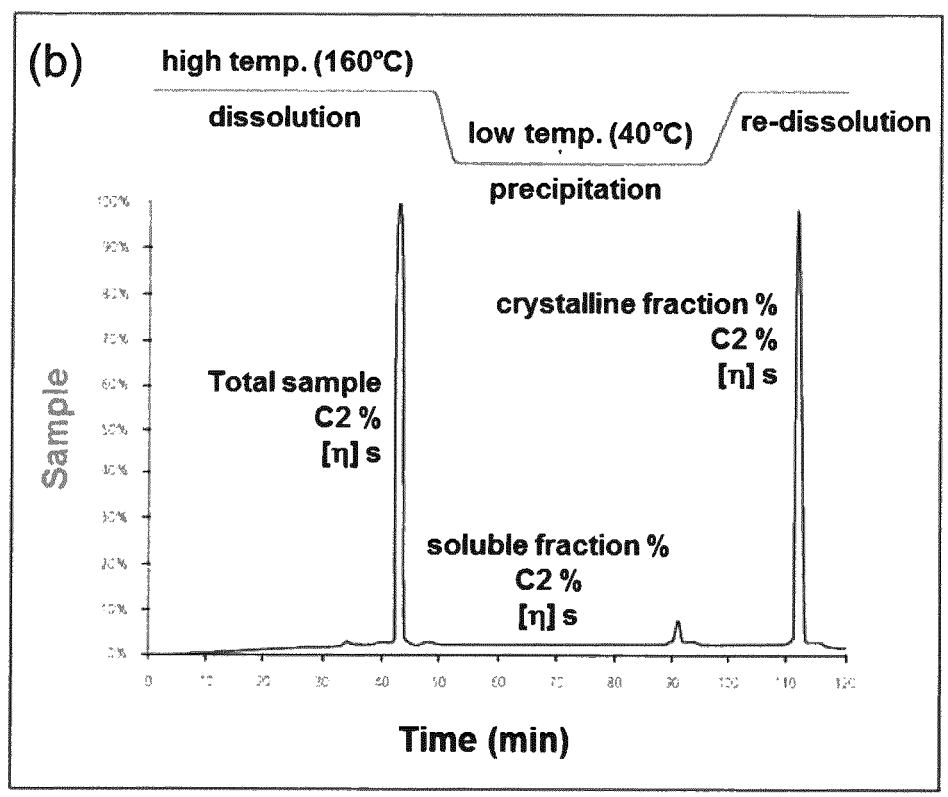
FIG. 1b relates to the elution of the polypropylene composition sample and obtained soluble and crystalline fractions in the TREF column (column filled with inert material e.g. glass beads) (see Del Hierro, P.; Ortin, A.; Monrabal, B.; 'Soluble Fraction Analysis in polypropylene, The Column Advanstar Publications, February 2014. Pages 18-23).

A schematic representation of the CRYSTEX QC instrument is shown in FIG. 1a. The crystalline and amorphous fractions were separated through temperature cycles of dissolution at 160° C., crystallization at 40° C. and re-dissolution in a 1,2,4-trichlorobenzene (1,2,4-TCB) at 160° C. as shown in FIG. 1b. Quantification of SF and CF and determination of ethylene content (C2) were achieved by means of an infrared detector (IR4) and an online 2-capillary viscometer was used for determination of the intrinsic viscosity (IV).

The IR4 detector was a multiple wavelength detector detecting IR absorbance at two different bands (CH3 and CH2) for the determination of the concentration and the Ethylene content in Ethylene-Propylene copolymers. IR4 detector was calibrated with series of EP copolymers with known Ethylene content in the range of 2 wt.-% to 69 wt.-% (determined by 13C-NMR).

The amount of Soluble Fraction (SF) and Crystalline Fraction (CF) were correlated through the XS calibration to the "Xylene Cold Soluble" (XCS) quantity and respectively Xylene Cold Insoluble (XCI) fractions, determined according to standard gravimetric method as per ISO16152. XS calibration was achieved by testing various EP copolymers with XS content in the range of 2-31 wt.-%.

Intrinsic viscosity (IV) of the parent EP copolymer and its soluble and crystalline fractions were determined with a use of an online 2-capillary viscometer and were correlated to corresponding IV's determined by standard method in decalin according to ISO 1628. Calibration was achieved with various EP PP copolymers with IV=2-4 dL/g.

A sample of the polyproylene composition to be analyzed was weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample was dissolved at 160° C. until complete dissolution is achieved, usually for 60 min, with constant stirring of 800 rpm.

As shown in a FIGS. 1a and b, a defined volume of the sample solution was injected into the column filled with inert support where the crystallization of the sample and separation of the soluble fraction from the crystalline part is taking place. This process was repeated two times. During the first injection, the whole sample was measured at high temperature, determining the IV[dl/g] and the C2[wt.-%] of the polypropylene composition. During the second injection, the soluble fraction (at low temperature) and the crystalline fraction (at high temperature) with the crystallization cycle were measured (wt.-% SF, wt.-% C2, IV).

Shrinkage (SH) was determined by injection moulding of the resin with an injection moulding machine into a mould having a cavity to form a plate of 60×60×2 mm$^3$ in line with ISO 1873. After cooling at room temperature for 96 hours, the length and the width of the plate were determined to calculate the longitudinal (in flow) and the transversal (across flow) shrinkage in percent.

Flexural Modulus was determined in 3-point-bending according to ISO 178 on 80×10×4 mm³ test bars injection moulded at 23° C. in line with EN ISO 1873-2.

Brittle-to-ductile transition temperature (BDTT) was measured based on the a(cN) values as determined from Charpy instrumented impact strength according to ISO 179-2:2000 on V-notched specimen with a geometry of 80×10×4 mm³ as required in ISO 179-1eA. The a(cN) values were determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

The coefficient of linear thermal expansion (CLTE) was determined in accordance with ISO 11359-2: 1999 on 10 mm long pieces cut from the same injection molded specimens as used for the flexural modulus determination. The measurement was performed in a temperature range from +23 to +80° C. and from −30 to +80° C., respectively, at a heating rate of 5° C./min.

DSC analysis, melting temperature ($T_m$), crystallization temperature (To), heat of fusion (Hm) and heat of crystallization (He): measured with a TA Instrument Q2000 differential scanning calorimetry (DSC) on 5 to 7 mg samples. DSC is running according to ISO 11357/part 3/method C2 in a heat/cool/heat cycle with a scan rate of 10° C./min in the temperature range of −30 to +225° C. Crystallization temperature ($T_c$) and heat of crystallization ($H_e$) are determined from the cooling step, while melting temperature ($T_m$) and heat of fusion ($H_m$) are determined from the second heating step.

Number average molecular weight (M) and weight average molecular weight (Mw) were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

2. Examples

All the chemicals and chemical reactions were handled under an inert gas atmosphere using Schlenk and glovebox techniques, with oven-dried glassware, syringes, needles or cannulas.

MAO was purchased from Albermarle and used as a 30 wt-% solution in toluene. Perfluoroalkylethyl acrylate ester mixture (CAS number 65605-70-1) was purchased from the Cytonix corporation, dried over activated molecular sieves (2 times) and degassed by argon bubbling prior to use.

Hexadecafluoro-1,3-dimethylcyclohexane (PFC) (CAS number 335-27-3) was obtained from commercial sources and dried over activated molecular sieves (2 times) and degassed by argon bubbling prior to use.

Triethylaluminum was purchased from Aldrich and used as a 1 M solution in n-hexane. Hydrogen is provided by Air Liquide and purified before use. Propylene is provided by Borealis and purified before use.

Complex:

As metallocene complex was used the racemic anti-dimethylsilanediyl[2-methyl-4-(4-tert-butylphenyl)-inden-1-yl] [2-methyl-4-(4-tert-butylphenyl)-5-methoxy-6-tert-butyl-inden-1-yl]zirconium dichloride (MC 1) according to the following formula

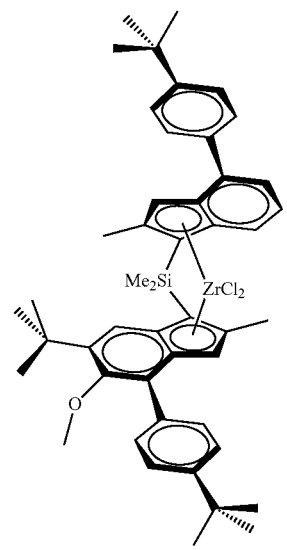

Synthesis of racemic anti-dimethylsilanediyl[2-methyl-4-(4-tert-butylphenyl)-inden-1-yl] [2-methyl-4-(4-tert-butylphenyl)-5-methoxy-6-tert-butyl-inden-1-yl]zirconium dichloride can be found in WO2013/007650.

Catalyst Preparation:

Inside the glovebox, 54 μL of dry and degassed mixture of perfluoroalkylethyl acrylate ester (used as surfactant) were mixed with 2 mL of MAO in a septum bottle and left to react overnight. The following day, 44.50 mg of metallocene MC1 (0.051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 1.0 g of a red solid catalyst was obtained.

Pre-Activation Procedure:

The catalyst as prepared above (MC1-Cat) was pre-polymerised according to the following procedure Off-line pre-polymerisation experiments were done in a 125 mL pressure reactor equipped with gas-feeding lines and an overhead stirrer. Dry and degassed perfluoro-1,3-dimethyl-cyclohexane (PFC)(15 ml) and the desired amount of the catalyst MC1-Cat (604.6 mg) to be pre-polymerised were loaded into the reactor inside a glove box and the reactor was sealed. The reactor was then taken out from the glove box and placed inside a water cooled bath kept at 25° C. The overhead stirrer and the feeding lines were then connected. The experiment was started by opening the propylene feed into the reactor and setting the stirrer speed at 450 rpm. The propylene feed was left open and the monomer consumption was compensated by keeping the total pressure in the reactor constant (about 5 barg). The experiment was continued for the polymerisation time (17.5 min) sufficient to provide the desired degree of polymerisation (DP). The reactor was then taken back inside the glove box before opening and the content was poured into a glass vessel. PFC was evaporated until a constant weight was obtained to yield 2.90 g of the pre-polymerised catalyst. The degree of polymerisation (DP) was determined gravimetrically and/or by analysis of the ash and/or aluminium content of the catalyst. Pre-polymerization degree is 3.8 g(PP)/g(cat). Prepolymerised MC 1-Cat is marked as PMC1-Cat.

The catalyst used and its composition is listed in table 1:

TABLE 1 used catalyst

| Catalyst type | DP g/g | MC1 wt.-% |
|---|---|---|
| PMC1-Cat | 3.8 | 0.65 |

Polymerisation

The polypropylene composition has been prepared by means of a 3-step polymerization (bulk homopolymerisation+gas phase (GP 1) homopolymerisation+gas phase (GP2) $C_2/C_3$ copolymerisation) in a 20-L reactor, as described below.

Step1: Bulk Propylene Homopolymerization

A stirred autoclave (double helix stirrer) with a volume of 21.2 dm³ containing 0.2 bar-g propylene, was filled with additional 3.97 kg propylene plus the amount of $H_2$ indicated in table 2. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (type as listed in the tables) was loaded into a 5-mL stainless steel vial inside the glovebox, the vial was attached to the autoclave, then a second 5-mL vial containing 4 ml n-hexane and pressurized with 10 bars of $N_2$ was added on top, the valve between the two vials was opened and the solid catalyst was contacted with hexane under $N_2$ pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internal reactor temperature reached 71° C., the amount of $H_2$ indicated in table 2 was added with a defined flow via thermal mass flow controller. The reactor temperature was held constant throughout the polymerization. The polymerization time was measured starting when the temperature was 2° C. below the set polymerization temperature.

Step 2: Gas Phase: Propylene Homopolymerization (GP1)

After the bulk step was finished, the stirrer speed was adjusted to 50 rpm and the reactor pressure was reduced to 0.5 bar below the set pressure by venting. Then the stirrer speed was set to 250 rpm, the reactor temperature to 80° C. and the amount of $H_2$ indicated in table 2 was dosed via MFC. Then the reactor P and T were held constant by propylene feed via MFC until the target split had been reached.

Step 3: Gas Phase: Ethylene/Propylene Copolymerization (GP2)

When the GP1 had been finished, the stirrer speed was reduced to 50 rpm. The reactor pressure was lowered to 0.3 barg by venting, the temperature and control device was set to 70° C. Then the reactor was filled with 200 g propylene at a flow of 70 g/min and flushed again to 0.3 barg.

Afterwards the stirrer speed was adjusted to 250 rpm. Then the reactor was filled with the chosen $C_3/C_2$ monomer ratio (transition feed, see table 2). The speed of the reactor filling during the transition was limited by the max. flow of the gas flow controllers. When the reactor temperature reached 69° C. and the reactor pressure reached the set value, the composition of the fed $C_3/C_2$ mixture was changed to the target copolymer composition and temperature and pressure were held constant until the amount of $C_3/C_2$ gas mixture required to reach the target rubber split had been consumed.

The reaction was stopped by setting the stirrer speed to 20 rpm, cooling the reactor to 30° C. and flashing the volatile components.

After flushing the reactor twice with $N_2$ and one vacuum/$N_2$ cycle, the product was taken out and dried overnight in a fume hood. 100 g of the polymer was additivated with 0.2 wt.-% ionol and 0.1 wt.-% PEPQ (dissolved in acetone) and then dried overnight in a hood plus 2 hours in a vacuum drying oven at 60° C. Table 2 summarizes the relevant polymerization parameters.

TABLE 2

Polymerisation parameters of the inventive example (IE)

| catalyst | | IE PMC1-Cat |
|---|---|---|
| Prepolymerisation | | |
| res. time | min | 10 |
| $H_2$ | Nl | 0 |
| Bulk polymerisation | | |
| Total $H_2$ | Nl | 2 |
| res. time | min | 40 |
| GP1 (homopolymerisation | | |
| $H_2$ | Nl | 2 |
| res. tune | min | 40 |
| GP2 (copolymerisation) | | |
| $H_2$ | Nl | 0 |
| res. tune | min | 90 |
| $C_2/C_3$ ratio transition | wt/wt | 0.56 |
| GP2 $C_3$ feed | g | 215 |
| GP2 $C_2$ feed | g | 53 |
| GP2 $C_2/C_3$ ratio | wt/wt | 0.25 |

The comparative example was polymerized in a Borstar PP pilot plant with a prepolymerisation reactor, one loop and three gas phase reactors using the commercial catalyst Avant ZN104 of LyondellBasell with Triethylaluminium (TEAL) as co-catalyst and Dicyclopentyldimethoxysilane (donor D) as external donor. Table 3 summarizes the relevant polymerization parameters.

TABLE 3

Polymerisation parameters of the comparative example (CE)

| | | |
|---|---|---|
| Co/ED ratio | mol/mol | 18 |
| Co/TC ratio | mol/mol | 220 |
| Prepolymerization | | |
| Residence time | h | 0.1 |
| Temperature | ° C. | 30 |
| Loop Reactor (LR) | | |
| Split | wt.-% | 32.5 |
| Temperature | ° C. | 70 |
| Pressure | kPa | 5355 |
| H2/C3 | mol/kmol | 14 |
| MFR | g/10 min | 35 |
| 1st Gas Phase Reactor (GPR1) | | |
| Split | wt.-% | 34.5 |
| Temperature | ° C. | 78 |
| Pressure | kPa | 2214 |
| H2/C3 | mol/kmol | 78 |
| MFR2 | g/10 min | 35 |
| 2nd Gas Phase Reactor (GPR2) | | |
| Split | wt.-% | 21 |
| Temperature | ° C. | 71 |
| Pressure | [kPa | 2202 |
| H2/C2 ratio | mol/kmol | 219 |
| C2/C3 ratio | mol/kmol | 715 |
| C2 | mol % | 12 |
| MFR | g/10 min | 12 |
| XCS | wt % | 19 |
| 3rd Gas Phase Reactor (GPR3) | | |
| Temperature | ° C. | 83 |
| Pressure | kPa | 1383 |
| C2/C3 ratio | mol/kmol | 747 |
| H2/C2 ratio | mol/kmol | 203 |
| MFR | g/10 min | 13 |
| split | wt % | 12 |

The resulting polymer powders were compounded in a co-rotating twin-screw extruder Prism TSE16 (for IE) resp. Coperion ZSK 57 (for CE) at 220° C. with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-5 butylphenyl) phosphate) phosphite) of BASF AG, Germany) and 0.05 wt.-% calcium stearate. The characteristics of the inventive example IE and of the comparative example CE are indicated in tables 4a and 4b below.

TABLE 4a

General polymer characteristics

| | | IE | CE |
|---|---|---|---|
| MFR | g/10 min | 14 | 12 |
| Catalyst | | SSC | ZN |
| Tm | ° C. | 149 | 163 |
| Hm | J/g | 68 | 73 |
| Tc | ° C. | 113 | 113 |
| SF | wt.-% | 32.4 | 32.5 |
| C2(total) | wt.-% | 6.5 | 15.8 |
| C2(SF) | wt.-% | 21.0 | 37.2 |

TABLE 4a-continued

General polymer characteristics

| | | IE | CE |
|---|---|---|---|
| C2(CF) | wt.-% | 0.5 | 6.2 |
| IV(total) | dl/g | 1.7 | 1.8 |
| IV(SF) | dl/g | 1.7 | 2.2 |
| IV(CF) | dl/g | 1.7 | 1.6 |
| IV(SF)/IV(CF) | n.a. | 1.0 | 1.3 |
| G' | MPa | 367 | 410 |
| Tg1 | ° C. | 0 | 2 |
| Tg2 | ° C. | −38 | −54 |
| SH-in flow | % | 0.89 | 0.97 |
| SH-across flow | % | 1.03 | 1.21 |
| Flexural modulus | MPa | 611 | 671 |
| BDTT Charpy NIS | ° C. | −2 | 12 |
| CLTE(−30-80° C.) | μm/m/° C. | 111 | 110 |

TABLE 4b

Polymer characteristics determined by NMR

| | | IE | CE |
|---|---|---|---|
| C2 total (NMR) | wt.-% | 6.5 | 15.8 |
| EEE | mol % | 1.87 | 8.77 |
| EEP | mol % | 4.33 | 8.55 |
| PEP | mol % | 3.52 | 4.76 |
| I(E) | % | 36 | 22 |
| C2 XCS (NMR) | wt.-% | 20.7 | 52.6 |
| EEE | mol % | 4.07 | 18.34 |
| FTP | mol % | 12.37 | 29.75 |
| PEP | mol % | 11.58 | 18.28 |
| I(E) | % | 41 | 28 |
| B(E) | % | 15 | 28 |
| XCS | wt.-% | 32.5 | 30.4 |
| IV(XCS) | dl/g | 1.7 | 2.1 |

From tables 4a and 4b, it can be gathered that the inventive example has an improved shrinkage, even if compared to a polypropylene composition that has been prepared in the presence of a Ziegler-Natta catalyst.

Figure 2:
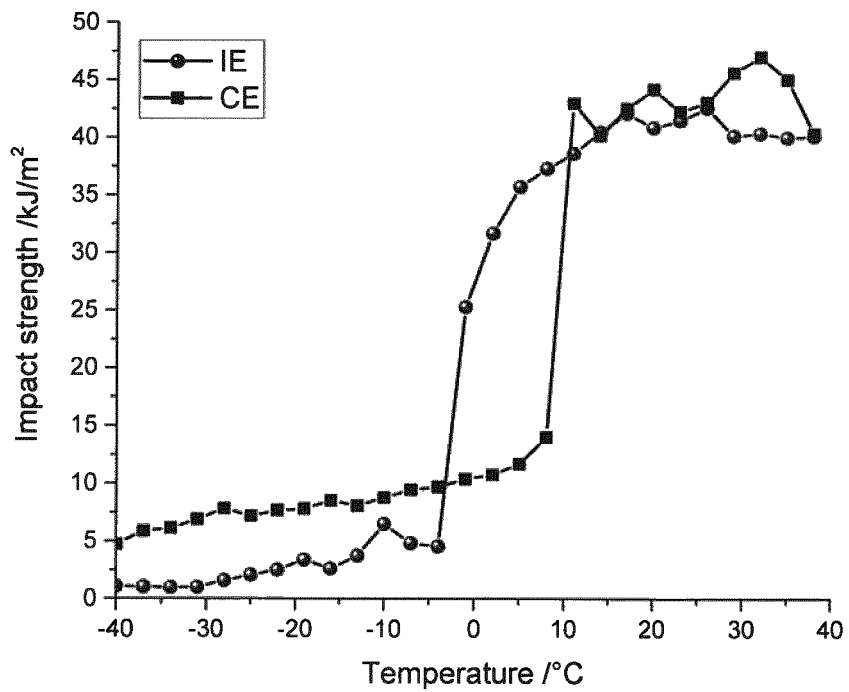
FIG. 2 shows the brittle-to-ductile transition temperatures (BDTT) of the inventive example IE as well as the comparative example CE.

In FIG. 2, the brittle-to-ductile transition temperatures (BDTT) are shown for the inventive example IE as well as for the comparative example CE. It can be gathered that the inventive example IE has a lower brittle-to-ductile transition temperatures (BDTT) than the comparative example CE and thus a broader application temperature range.

The invention claimed is:

1. A polypropylene composition having a melt flow rate $MFR_2$ (230° C.) measured according to ISO 1133 in the range of 5 to 50 g/10 min, the polypropylene composition comprising:
   (a) 55 to 75 wt. %, based on the total weight of the polypropylene composition, of a crystalline fraction (CF) as determined in the CRYSTEX QC method, the crystalline fraction (CF) having
      i) a melting temperature (Tm) measured by differential scanning calorimetry (DSC) between 147° C. and 162° C., and
      ii) an ethylene content of 1 wt. %, based on the total weight of the crystalline fraction (CF); and
   (b) 25 to 45 wt. %, based on the total weight of the polypropylene composition, of a soluble fraction (SF) as determined in a CRYSTEX QC method, the soluble fraction (SF) having
      i) an intrinsic viscosity (IV) in the range of 1.0 to 2.0 dl/g, and
      ii) an ethylene content in the range of 18 to 30 wt. %, based on the total weight of the soluble fraction (SF), wherein said polypropylene composition has a ratio of intrinsic viscosity of the soluble fraction (IV(SF)) to intrinsic viscosity of the crystalline fraction (IV(CF)) [(IV(SF))/(IV(CF))] in the range from 0.8 to 1.1, and wherein the polypropylene composition is polymerized in the presence of a single-site catalyst consisting of racemic anti-dimethylsilanediyl[2-methyl-4-(4-tert-butylphenyl)-inden-1-yl] [2-methyl-4-(4-tert-butylphenyl)-5-methoxy-6-tert-butyl-inden-1-yl]zirconium dichloride and methylaluminoxane (MAO) as cocatalyst.

2. The polypropylene composition according to claim 1, wherein the polypropylene composition comprises a polypropylene homopolymer matrix (M) and an ethylene-propylene copolymer (EPC) dispersed in the polypropylene homopolymer matrix (M).

3. The polypropylene composition according to claim 1, wherein the polypropylene composition comprises 60 to 72 wt. %, based on the total weight of the polypropylene composition, of the crystalline fraction (CF), and 28 to 40 wt. %, based on the total weight of the polypropylene composition, of the soluble fraction (SF).

4. The polypropylene composition according to claim 1, wherein the polypropylene composition has:
   i) an ethylene content in the range of 4.0 to 15.0 wt. %, based on the total weight of the polypropylene composition, and/or
   ii) a melt flow rate $MFR_2$ (230° C.) measured according to ISO 1133 in the range of 8 to 40 g/10 min.

5. The polypropylene composition according to claim 1, wherein the polypropylene composition has:
   i) a melting temperature ($T_m$) measured by differential scanning calorimetry (DSC) between 147° C. and 162° C., and/or
   ii) a crystallization temperature ($T_c$) measured by differential scanning calorimetry (DSC) between 105° C. and 135° C.

6. The polypropylene composition according to claim 1, wherein the polypropylene composition has been produced in a multi-stage process.

7. The polypropylene composition according to claim 1, wherein the crystalline fraction (CF) has:
   i) a melting temperature ($T_m$) measured by differential scanning calorimetry (DSC) between 148° C. and 156° C., and/or
   ii) an ethylene content in the range from 0.1 to 0.8 wt. %, based on the total weight of the crystalline fraction, and/or
   iii) an intrinsic viscosity (IV) in the range of 0.9 to 2.2 dl/g, and/or
   iv) an isotacticity determined as pentad regularity from 13C-NMR spectroscopy of at least 98%, and/or
   v) a content of <2,1>erythro regiodefects as determined from 13C-NMR spectroscopy of equal or less than 0.2 mol.-%.

8. The polypropylene composition according to claim 1, wherein the soluble fraction (SF) has:
   an intrinsic viscosity (IV) in the range of 1.1 to 1.9 dl/g.

9. The polypropylene composition according to claim 1, wherein the relative content of isolated to block ethylene sequences (I(E)):
   i) of the polypropylene composition is at most 30%, and/or
   ii) of the xylene cold soluble fraction (XCS) is at least 30%,
   wherein the I(E) content is defined by equation (I)

$$I(E) = \frac{fPEP}{(fEEE + fEEP + fPEP)} \times 100 \quad (I)$$

wherein I(E) is the relative content of isolated to block ethylene sequences [in %];
fPEP is the mol fraction of propylene/ethylene/propylene sequences (PEP) in the sample;
fEEP is the mol fraction of ethylene/ethylene/propylene sequences (EEP) and of propylene/ethylene/ethylene sequences (PEE) in the sample;
fEEE is the mol fraction of ethylene/ethylene/ethylene sequences (EEE) in the sample wherein all sequence concentrations being based on a statistical triad analysis of $^{13}$C-NMR data.

10. A process for the preparation of a polypropylene composition according to claim 1, wherein a polypropylene homopolymer matrix (M) is prepared in a first stage and an ethylene-propylene copolymer (EPC) is prepared in a second stage in the presence of the polypropylene homopolymer matrix (M).

11. A composition comprising the polypropylene composition according to claim 1 and one or more additive(s) in an amount of up to 4 wt.-%, based on the total weight of the composition.

12. An article comprising the polypropylene composition according to claim 1.

13. The process according to claim 10, wherein the polymer composition has a brittle-to-ductile transition temperature (BDTT) as measured in an instrumented Charpy notched impact strength test in line with ISO 179 1 eA in the range from −10 to +5° C.

* * * * *